United States Patent
Parpia et al.

(10) Patent No.: US 9,280,757 B2
(45) Date of Patent: Mar. 8, 2016

(54) AUTOMATED INVENTORY MANAGEMENT

(71) Applicant: DecisionGPS, LLC, Irving, TX (US)

(72) Inventors: Ijaz Husain Parpia, Southlake, TX (US); Gurdip Singh, Coppell, TX (US)

(73) Assignee: DecisionGPS, LLC, Irving, TX (US)

( * ) Notice: Subject to any disclaimer, the term of this patent is extended or adjusted under 35 U.S.C. 154(b) by 18 days.

(21) Appl. No.: 14/103,417

(22) Filed: Dec. 11, 2013

(65) Prior Publication Data

US 2014/0344118 A1 Nov. 20, 2014

Related U.S. Application Data

(60) Provisional application No. 61/823,292, filed on May 14, 2013.

(51) Int. Cl.
*G06Q 10/00* (2012.01)
*G06Q 10/08* (2012.01)

(52) U.S. Cl.
CPC .................. *G06Q 10/087* (2013.01)

(58) Field of Classification Search
CPC ................. G06F 17/00; G07G 1/00
USPC ............................................. 705/28
See application file for complete search history.

(56) References Cited

U.S. PATENT DOCUMENTS

| | | | | |
|---|---|---|---|---|
| 5,487,603 A | * | 1/1996 | Hoff et al. | 366/141 |
| 7,092,929 B1 | * | 8/2006 | Dvorak et al. | 705/28 |
| 7,155,402 B1 | * | 12/2006 | Dvorak | 705/14.41 |
| 7,295,990 B1 | * | 11/2007 | Braumoeller et al. | 705/7.31 |
| 7,747,543 B1 | * | 6/2010 | Braumoeller et al. | 705/330 |
| 8,285,582 B2 | * | 10/2012 | Bateni et al. | 705/7.31 |
| 8,285,584 B2 | * | 10/2012 | Fotteler et al. | 705/7.35 |
| 8,325,036 B1 | * | 12/2012 | Fuhr et al. | 340/540 |
| 2005/0108324 A1 | * | 5/2005 | Stritzinger et al. | 709/203 |
| 2005/0209732 A1 | * | 9/2005 | Audimoolam et al. | 700/216 |
| 2006/0122858 A1 | * | 6/2006 | Miles et al. | 705/1 |
| 2007/0284442 A1 | * | 12/2007 | Herskovitz | 235/383 |
| 2009/0138384 A1 | * | 5/2009 | McCormick et al. | 705/28 |
| 2009/0172035 A1 | * | 7/2009 | Lessing et al. | 707/104.1 |
| 2010/0138281 A1 | * | 6/2010 | Zhang et al. | 705/10 |
| 2011/0055172 A1 | * | 3/2011 | Tan et al. | 707/692 |
| 2012/0035746 A1 | * | 2/2012 | Broom | 700/21 |
| 2012/0232942 A1 | * | 9/2012 | Gaug et al. | 705/7.12 |
| 2013/0144435 A1 | * | 6/2013 | Czaplewski et al. | 700/241 |

OTHER PUBLICATIONS

"Visual Shelf Monitoring," Mathecsys, www.http://mathecsys.com/visual-shelf-monitoring/, printed on Dec. 10, 2013, 6 pages.
Dudley, Renee, "Wal-Mart Plasters Stores with Green Dots in Struggle to Keep Shelves Stocked," Financial Post, May 24, 2013, 5 pages.

* cited by examiner

*Primary Examiner* — Seye Iwarere
(74) *Attorney, Agent, or Firm* — McClure and Associates, PLLC

(57) ABSTRACT

A method comprising determining an inventory exception inference associated with a product, determining an inventory inspection directive for the product based, at least in part, on the inventory exception inference, receiving the inspected inventory state data based, at least in part, on the inventory inspection directive, and determining that an actual inventory exception exists for the product based, at least in part, on the inspected inventory state data is disclosed.

20 Claims, 16 Drawing Sheets

AUTOMATED INVENTORY MANAGEMENT

RELATED APPLICATION

This application claims the benefit of U.S. provisional application No. 61/823,292, filed May 14, 2013, entitled, "Automated Inventory Management," which is incorporated herein in its entirety by reference for all purposes.

BACKGROUND

This disclosure relates in general to the field of inventory management.

Inventory management systems have progressed in sophistication and precision through the advent of the computer. Perpetual inventory systems have been developed to track and update inventory quantity and availability on a continuous basis as a function of doing business. Perpetual inventory systems are not immune from errors and, in some cases, are vulnerable to errors due to overstatements (phantom inventory) or understatements that can occur as a result of theft, breakage, scanning errors or untracked inventory movements, leading to systematic errors in replenishment, among other issues.

Unmanned aerial vehicles (UAV), or "drones", are aircraft without a human pilot onboard. In some cases, a UAV can be computer-controlled, while in other cases a UAV can be remote controlled by a human user. Applications for UAVs are increasing with UAVs currently used in military intelligence and weaponry, oil and gas exploration, domestic policing, scientific research, nature conservation, among others.

SUMMARY

One or more embodiments may provide an apparatus, a computer readable medium, a non-transitory computer readable medium, a system, a computer program product, and a method for determining an inventory exception inference associated with a product, the inventory exception inference being an identification of circumstances that indicate occurrence of a circumstance where an inventory state of the product differs from an inventory plan for the product, determining an inventory inspection directive for the product based, at least in part, on the inventory exception inference, the inventory inspection directive being one or more commands that instruct acquisition of inspected inventory state data for the product, the inspected inventory state data being inventory state data that is based, at least in part on observance of the product, receiving the inspected inventory state data based, at least in part, on the inventory inspection directive, and determining that an actual inventory exception exists for the product based, at least in part, on the inspected inventory state data.

One or more embodiments may provide an apparatus, a computer readable medium, a non-transitory computer readable medium, a system, and a computer program product, comprising means for determining an inventory exception inference associated with a product, the inventory exception inference being an identification of circumstances that indicate occurrence of a circumstance where an inventory state of the product differs from an inventory plan for the product, determining an inventory inspection directive for the product based, at least in part, on the inventory exception inference, the inventory inspection directive being one or more commands that instruct acquisition of inspected inventory state data for the product, the inspected inventory state data being inventory state data that is based, at least in part on observance of the product, receiving the inspected inventory state data based, at least in part, on the inventory inspection directive, and determining that an actual inventory exception exists for the product based, at least in part, on the inspected inventory state data.

One or more example embodiments further perform determination of an inventory correction directive based, at least in part, on the determination that the actual inventory exception exists.

One or more example embodiments further perform receipt of tracked inventory state data associated with the product, wherein the determination of the inventory exception inference is based, at least in part, on the tracked inventory state data.

In at least one example embodiment, the tracked inventory state data is data that is based, at least in part, on tracking of events that cause changes in inventory.

In at least one example embodiment, the tracked inventory state data comprises information associated with at least one restocking event, at least one sale event, at least one shipment event, or at least one discard event.

One or more example embodiments further perform receipt of sale projection data associated with the product, and receipt of actual sale data associated with the product, wherein the determination of the inventory exception inference comprises determination that the actual sales data deviates from the sale projection data beyond a deviation tolerance.

One or more example embodiments further perform receipt of customer comment data associated with the product, wherein the determination of the inventory exception inference is based, at least in part, on the customer comment data.

In at least one example embodiment, the customer comment data is based, at least in part, on at least one of a customer support comment, a customer feedback comment, or a social media post.

In at least one example embodiment, the inventory inspection directive instructs acquisition of inspected inventory state data for the product by way of deployment of a data acquisition mission to a location that is designated for the product by an inventory plan.

In at least one example embodiment, the inventory inspection directive comprises instructions configured to inform a human of the product and the location.

In at least one example embodiment, the inventory inspection directive further comprises instructions configured to inform the human of the inventory exception inference.

In at least one example embodiment, the inspected inventory state data comprises information indicative of one or more observations of the human in conformance with the inventory inspection directive, and the inspected inventory state data is received by way of a user interface.

In at least one example embodiment, the inventory inspection directive is an automated inventory inspection directive that comprises instructions configured to identify the product and the location as, at least part of, mission data for an automated inventory data acquisition device, and the inspected inventory state data is received from the automated inventory data acquisition device.

In at least one example embodiment, the automated inventory inspection directive comprises instructions configured to cause the automated inventory data acquisition device to embark on a mission in accordance with the inventory inspection directive.

In at least one example embodiment, the inspected inventory state data is received from the automated inventory data acquisition device, and the inspected inventory state data comprises visual information acquired by the automated inventory data acquisition device.

In at least one example embodiment, determination that an actual inventory exception exists comprises determination that the visual information indicates non-conformance with an inventory plan.

One or more example embodiments further perform determination of a subset of the visual information based, at least in part, on the inventory exception inference, wherein the determination that the visual information indicates non-conformance with the inventory plan fails to include visual information beyond the subset of the visual information.

One or more example embodiments further perform storage of the inspected inventory state data as historical inspected inventory state data in a historical inspected inventory state data repository.

In at least one example embodiment, the inventory inspection directive is a historical inventory inspection directive that instructs evaluation of historical inspected inventory state data, and the inspected inventory state data is received from a historical state data repository.

In at least one example embodiment, the inventory exception inference is a maverick product exception inference, and the inventory inspection directive comprises information that identifies the product.

In at least one example embodiment, a maverick product exception refers to a non-conforming product placement.

In at least one example embodiment, determination that the actual inventory exception exists comprises search of the historical inspected inventory state data for a visual representation of the product, and identification of a non-conformant location of the product, the non-conformant location being a location that fails to conform with a location that is designated for the product by an inventory plan.

One or more example embodiments further perform determination of an inventory correction directive based, at least in part, on the determination that the actual inventory exception exists, wherein the inventory correction directive comprises information indicative of the non-conformant location.

One or more example embodiments further perform identification of historical inspected inventory state data that corresponds with a location that is designated for the product by the inventory plan, wherein the search of the historical inspected inventory state data omits the historical inspected inventory state data that corresponds with the location that is designated for the product by the inventory plan.

One or more example embodiments further perform determination of a different inventory inspection directive based, at least in part, on a routine inspection schedule, the different inventory inspection directive being one or more commands that instruct acquisition of different inspected inventory state data for the product, receipt of the different inspected inventory state data based, at least in part, on the different inventory inspection directive, and storage of the different inspected inventory state data as historical inspected inventory state data in a historical inspected inventory state data repository.

In at least one example embodiment, the historical inspected inventory state data comprises information indicative of inspected inventory state data that was based, at least in part, on a prior determination of a different inventory exception.

In at least one example embodiment, the historical inspected inventory state data comprises information indicative of inspected inventory state data that was based, at least in part, on a routine inspection schedule.

One or more embodiments may provide an apparatus, a computer readable medium, a non-transitory computer readable medium, a computer program product, and a method for transmitting a radio frequency signal, receiving transmission of a set of response signals to the radio frequency signal from a set of radio frequency identifier (RFID) tags, and determining a location of a device based on the set of response signals.

One or more embodiments may provide an apparatus, a computer readable medium, a non-transitory computer readable medium, and a computer program product, comprising means for transmitting a radio frequency signal, receiving transmission of a set of response signals to the radio frequency signal from a set of radio frequency identifier (RFID) tags, and determining a location of a device based on the set of response signals.

One or more example embodiments further perform adjusting position of the device based on the determined location.

In at least one example embodiment, the device is to be positioned at a location of a retail site where a data collection task is to be performed.

One or more example embodiments further perform sending location data identifying the location to a remote computing device, receiving navigation instructions from the remote computing device based on the location, wherein the position of the device is adjusted based on the navigation instructions.

In at least one example embodiment, each response signal includes a unique identifier, and determining the location includes identifying that the set of unique identifiers correspond to the location through a mapping of the unique identifiers of the RFID tags to physical positions within an environment where the RFID tags are mounted.

In at least one example embodiment, the radio frequency signal corresponds to a first location query.

One or more example embodiments further perform transmitting a radio frequency signal in a second location query, receiving another, different set of response signals to the second query from a different set of RFID tags in an environment, and determining movement of the device from the location to another location corresponding to the different set of RFID tags.

In at least one example embodiment, the set of RFID tags comprise a subset of a plurality of tags positioned within an environment, each RFID tag corresponding to a position within the environment.

In at least one example embodiment, the plurality of tags are positioned in a grid pattern within the environment.

In at least one example embodiment, the device comprises an unmanned aerial vehicle.

In at least one example embodiment, at least a portion of the environment is indoors.

One or more embodiments may provide an apparatus, a computer readable medium, a non-transitory computer readable medium, a computer program product, and a method for receiving environment data describing a state of a retail fixture, comparing the environment data with planogram data describing a planogram corresponding to the retail fixture, and determining an event relating to the retail fixture based at least in part on the comparison.

One or more embodiments may provide an apparatus, a computer readable medium, a non-transitory computer readable medium, and a computer program product, comprising means for receiving environment data describing a state of a retail fixture, comparing the environment data with planogram data describing a planogram corresponding to the retail fixture, and determining an event relating to the retail fixture based at least in part on the comparison.

One or more embodiments may provide an apparatus, a computer readable medium, a non-transitory computer readable medium, a computer program product, and a method for receiving environment data describing a state of a retail fixture, comparing the environment data with fixture labeling data describing a fixture labeling corresponding to the retail fixture, and determining an event relating to the retail fixture based at least in part on the comparison.

One or more embodiments may provide an apparatus, a computer readable medium, a non-transitory computer readable medium, and a computer program product, providing means for receiving environment data describing a state of a retail fixture, means for comparing the environment data with fixture labeling data describing a fixture labeling corresponding to the retail fixture, and means for determining an event relating to the retail fixture based at least in part on the comparison.

One or more embodiments may provide an apparatus, a computer readable medium, a non-transitory computer readable medium, a computer program product, and a method for receiving environment data describing a state of a retail fixture, comparing the environment data with signage data describing signage corresponding to the retail fixture, and determining an event relating to the retail fixture based at least in part on the comparison.

One or more embodiments may provide an apparatus, a computer readable medium, a non-transitory computer readable medium, and a computer program product, providing means for receiving environment data describing a state of a retail fixture, means for comparing the environment data with signage data describing a signage corresponding to the retail fixture, and means for determining an event relating to the retail fixture based at least in part on the comparison.

In at least one example embodiment, the environment data comprises a photograph of the retail fixture.

In at least one example embodiment, the event comprises misplacement of merchandise at the retail fixture.

In at least one example embodiment, the event comprises detection of damaged merchandise at the retail fixture In at least one example embodiment, the event comprises detection of insufficient inventory at the retail fixture.

In at least one example embodiment, the event comprises non-compliance with a marketing agreement.

One or more embodiments may provide an apparatus, a computer readable medium, a non-transitory computer readable medium, a computer program product, and a method for identifying data comprising an image of a fixture including a set of retail products, identifying location data identifying a location within a retail site corresponding to the photographic image, determining a subset of a plurality of product images corresponding to retail products mapped to the location, wherein each product image comprises an image of a respective one of a plurality of retail products and the set of retail products is a subset of the plurality of retail products, and performing image analysis to compare the subset of product images to the photographic image to detect whether retail products mapped to the location are present at the fixture.

One or more embodiments may provide an apparatus, a computer readable medium, a non-transitory computer readable medium, and a computer program product, comprising means for identifying data comprising an image of a fixture including a set of retail products, identifying location data identifying a location within a retail site corresponding to the photographic image, determining a subset of a plurality of product images corresponding to retail products mapped to the location, wherein each product image comprises an image of a respective one of a plurality of retail products and the set of retail products is a subset of the plurality of retail products, and performing image analysis to compare the subset of product images to the photographic image to detect whether retail products mapped to the location are present at the fixture.

In at least one example embodiment, product images outside the subset of product images are omitted from the image analysis.

One or more example embodiments further perform determining, from the image analysis, whether merchandise is misplaced at the fixture.

One or more example embodiments further perform determining, from the image analysis, whether merchandise is damaged at the fixture.

One or more example embodiments further perform determining, from the image analysis, an amount of inventory at the fixture.

In at least one example embodiment, the image comprises a photographic image.

In at least one example embodiment, the image comprises an ultrasound image.

One or more embodiments may provide an apparatus, a computer readable medium, a non-transitory computer readable medium, a computer program product, and a method for receiving mission instructions defining at least one inventory management task to be performed by an unmanned vehicle, navigating to a particular location corresponding to the inventory management task, and performing the inventory management task at the particular location, wherein information is collected during the inventory management task by one or more sensors of the unmanned vehicle, the information describing conditions of the particular location.

One or more embodiments may provide an apparatus, a computer readable medium, a non-transitory computer readable medium, and a computer program product, comprising means for receiving mission instructions defining at least one inventory management task to be performed by an unmanned vehicle, navigating to a particular location corresponding to the inventory management task, and performing the inventory management task at the particular location, wherein information is collected during the inventory management task by one or more sensors of the unmanned vehicle, the information describing conditions of the particular location.

In at least one example embodiment, navigating to the particular location includes adjusting elevation of the one or more sensors to a predefined elevation corresponding to the inventory management task.

In at least one example embodiment, the particular location corresponds to a retail fixture.

In at least one example embodiment, the one or more sensors includes one or more of a digital camera, an echolocation sensor, a contact sensor, an RFID reader, and barcode reader.

In at least one example embodiment, at least one of the one or more sensors is used to both collect the information and guide navigation of the unmanned vehicle.

In at least one example embodiment, the mission instructions comprise a plurality of inventory management tasks.

One or more example embodiments further perform navigating to a home base following completion of the inventory management task.

One or more example embodiments further perform uploading result data to a computing device at the home base, the result data describing the information collected during the inventory management task.

In at least one example embodiment, navigating to the particular location includes receiving navigation directions in flight from a remote computing device over a wireless communication channel.

One or more embodiments may provide an apparatus, a computer readable medium, a non-transitory computer readable medium, a computer program product, and a method for determining one or more inventory management tasks to be performed by an unmanned vehicle within a retail environment, sending mission instructions to the unmanned vehicle, wherein the mission instructions include navigation information for use by the unmanned vehicle to navigate to a particular location within the retail environment, and receiving result data describing conditions of the retail environment collected by the unmanned vehicle in accordance with the mission instructions.

One or more embodiments may provide an apparatus, a computer readable medium, a non-transitory computer readable medium, and a computer program product, comprising means for determining one or more inventory management tasks to be performed by an unmanned vehicle within a retail environment, sending mission instructions to the unmanned vehicle, wherein the mission instructions include navigation information for use by the unmanned vehicle to navigate to a particular location within the retail environment, and receiving result data describing conditions of the retail environment collected by the unmanned vehicle in accordance with the mission instructions.

In at least one example embodiment, the inventory management tasks are to be performed according to a schedule.

In at least one example embodiment, the inventory management tasks are to be performed based at least in part on past inventory management task results.

In at least one example embodiment, the unmanned vehicle comprises an unmanned aerial vehicle.

In at least one example embodiment, the unmanned aerial vehicle comprises one or more rotors.

One or more example embodiments further perform assessing the result data for one or more of merchandise misplaced at the fixture, damaged merchandise, an amount of inventory and compliance of a fixture or advertisement with one or more rules.

In at least one example embodiment, result data comprises image data and assessing the result data includes comparing the image data to a planogram of a fixture within the retail environment.

One or more example embodiments further perform generating a report based on the results of the assessment.

BRIEF DESCRIPTION OF THE DRAWINGS

For a more complete understanding of embodiments of the invention, reference is now made to the following descriptions taken in connection with the accompanying drawing in which.

DESCRIPTION

Inventory management has traditionally utilized human labor to manually count, often with electronic aids (e.g., using handheld scanners or data entry devices) inventory in a retail establishment or warehouse. Robotic and other computer-controlled devices can be utilized to automate portions of tasks associated with inventory management, merchandising strategy, retail floor planning, licensing, marketing, and promotional compliance, and other tasks. Many retail establishments are indoor marketplaces. Controlling and automating such devices can be complicated by the need not only to position the device accurately in order to collect the required data, but to do so in spatially restricted, dynamic environments with changing floor, display fixture, and storage location arrangements. The task is often further complicated when there is poor compliance with product storage or display plans and directives, and by the presence of shoppers, warehouse workers or store associates, and other transient equipment and obstacles that may be present on pre-programmed facility and fixture inspection paths.

Figure 1:
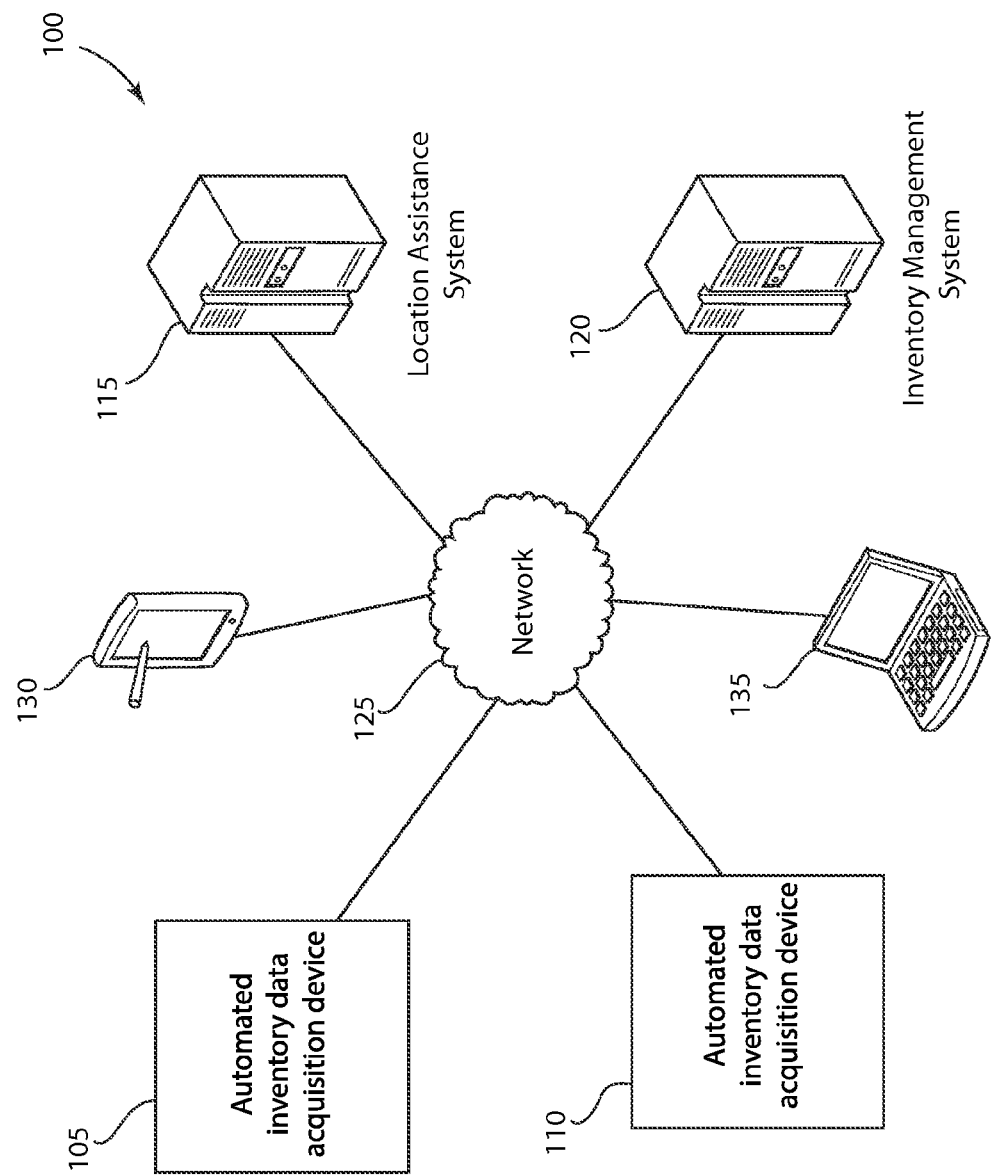
FIG. 1 is a diagram illustrating one or more automated inventory data acquisition devices according to at least one example embodiment.

Turning to FIG. 1, one or more automated inventory data acquisition devices (e.g., 105, 110) can be made available for deployment within a warehouse or retail establishment, to perform tasks and gather information in connection with the management of inventory within the retail facility. In some examples, the automated inventory data acquisition devices 105, 110 can be implemented as UAVs equipped with scanners and sensors enabling the automated inventory data acquisition devices (or "robots") to programmatically navigate over and around the layout and obstacles of the retail facility. A location assistance system 115 can be provided, in some implementations, that can provide instructions to the automated inventory data acquisition devices 105, 110 to assist in guiding the automated inventory data acquisition devices 105, 110 to a particular area of the retail facility corresponding to a particular inventory and retail management task. In some implementations, functionality can be provided locally on the automated inventory data acquisition devices 105, 110 to perform at least a portion of the navigation to, from, and between tasks.

In some implementations, a location assistance system 115 can be provided in connection with an inventory management system 120. Inventory management system 120 can manage inventory and retail management tasks as well as data collected in connection with the tasks. In some instances, functionality of location assistance system 115 and inventory management system 120 can be at least partially combined. For instance, inventory management system 120 can manage what tasks are to be performed and the schedule for the performance of such tasks. Tasks can be associated with particular locations within a retail facility and location assistance system 115 can provide either primary or corroborating position awareness services, communicating current location information to one or more automated inventory data acquisition devices, as well as, in some cases, directions to target locations, over a network (e.g., 125), such a wireless network, to the automated inventory data acquisition devices 105, 110. The automated inventory data acquisition devices 105, 110 can perform the tasks and report task result data to inventory management system 120, for instance, over network 125, to the inventory management system 120.

In some implementations, one or more endpoint or user devices (e.g., 130, 135) can also be provided for use by human users to interface with one or more of automated inventory data acquisition devices 105, 110, location assistance system 120, and inventory management system 125, etc. User devices can be utilized, for instance, to troubleshoot and program aspects of automated inventory data acquisition devices 105, 110. User devices 130, 135 can be used to define, supplement, edit, or otherwise access and maintain programs, tasks, missions, and result data generated and used in environment 100 by one or more of automated inventory data acquisition devices 105, 110, location assistance system 120, and inventory management system 125, among other examples. In some implementations, endpoint devices can further include functionality for supplementing or auditing scans performed by automated inventory data acquisition devices 105, 110, such as handheld scanner devices with scanning hardware and software similar to that employed on automated inventory data acquisition devices 105, 110, among other examples. For instance, handheld scanners can be utilized in the event an error or unavailability of a robot, allowing a human user to back-up the operation of robot when needed, or check the accuracy and calibration of automated inventory data acquisition devices, among other examples.

In general, "servers," "clients," "computing devices," "host devices," "endpoint devices," "network elements," "hosts," "robots," and "systems," including devices, systems, and subsystems in example computing environment 100 (e.g., 105, 110, 115, 120, 130, 135, etc.), can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, robots, network elements, systems, and computing devices (e.g., 105, 110, 115, 120, 130, 135, etc.) can each include one or more processors, computer-readable memory, and one or more interfaces, among other features and hardware. Servers and systems can include any suitable software component or module, including distributed, enterprise, or cloud-based software applications, data, and services. For instance, in some implementations, an inventory management system 120 or another sub-system of computing system 100 can be a cloud-implemented system configured to remotely host, serve, or otherwise manage data, software services and applications interfacing, coordinating with, dependent on, or used by other services and devices in system 100. In some instances, a server, system, subsystem, or computing device can be implemented as some combination of devices that can be hosted on a common computing system, server, server pool, or cloud computing environment and share computing resources, including shared memory, processors, and interfaces.

Host, endpoint, client, or client computing devices (e.g., 130, 135, etc.) can include traditional and mobile computing devices, including personal computers, laptop computers, tablet computers, smartphones, personal digital assistants, feature phones, handheld video game consoles, notebook computers, desktop computers, internet-enabled televisions, and other devices designed to interface with human users and capable of communicating with other devices over one or more networks (e.g., 125). Such devices can also include computer-assisted, or "smart," appliances, such as household and industrial devices and machines that include computer processors and/or one or more software programs executed by the computer processors that control, monitor, assist, supplement, or otherwise enhance the functionality of the devices.

Attributes of host computing devices, computer-assisted appliances, servers, and computing devices generally can vary widely from device to device, including the respective operating systems and collections of applications, security tools, and other software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices. A similarly diverse array of hardware can be utilized and included in host computing devices, including a variety of different chip sets, ports, display devices, network interface hardware, input devices, peripherals, and other hardware-based components. Graphical display devices and user interfaces, including touchscreen devices and other devices supported by computer processors of the host devices, can further allow a user to view and interact with graphical user interfaces of applications and other programs provided in system 100, including user interfaces and graphical representations of programs interacting with applications hosted within the host devices, as well as graphical user interfaces associated with remote servers, etc. Moreover, while system devices may be described in terms of being used by one user, this disclosure contemplates that many users may use one computer or that one user may use multiple computers.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Traditionally, inventory, marketing, promotional, and merchandising management within retail establishments has been an at least partially a manual endeavor. In some cases, multiple retail employees or auditors are deployed to manually scan, inspect, and assess goods within a retail establishment or warehouse. In the case of retail, such inventory- and merchandise-related tasks may interfere with the experience of consumers shopping within the retail establishment, causing such tasks as cycle counts to be performed after hours. Traditional inventory and merchandise management can be disruptive to the consumer experience, error prone, and expensive, both in terms of labor costs as well as utility costs, as the air conditioning, lighting, etc. of the retail establishment are left on to accommodate employees performing the checks, in some instances.

In some aspects, the systems and procedures described herein can address at least some of these (and other issues). In some implementations, multiple inventory- and merchandise-related tasks can be automated through the use of robots or drones equipped with sensors that allow the devices to maneuver effectively around a facility (including in areas less assessable to humans, such as upper shelves or crowded areas of a warehouse), perform some tasks in low or no lighting and with little or no human direction.

Figure 2:
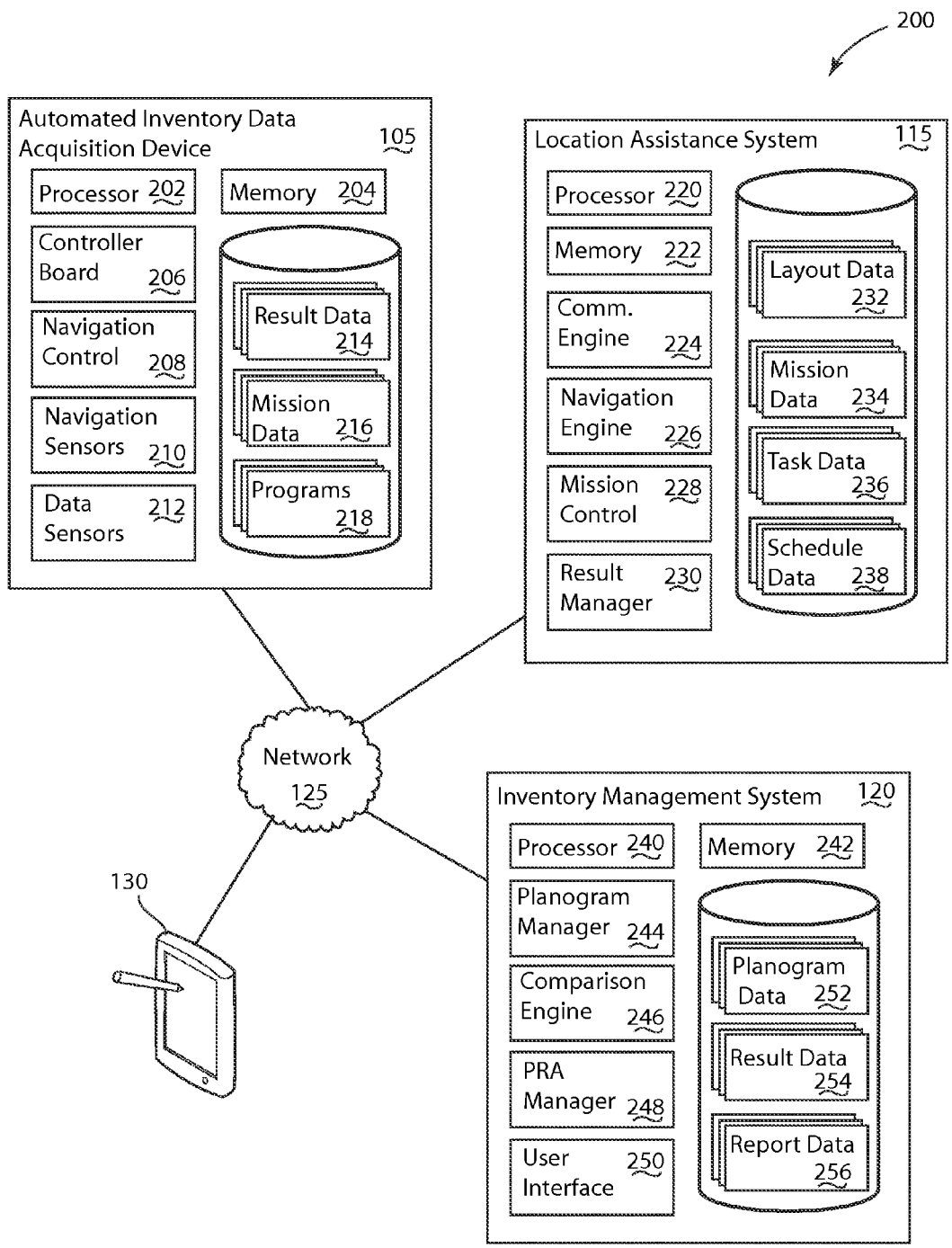
FIG. 2 is a diagram illustrating a system including an automated inventory data acquisition device, a location assistance system, an inventory management system, and one or more endpoint devices according to at least one example embodiment.

FIG. 2 is a simplified schematic diagram of a system 200 including an automated inventory data acquisition device 105, location assistance system 115, inventory management system 120, and one or more endpoint devices (e.g., 130). In one example implementation, automated inventory data acquisition devices (e.g., 105) can include one or more processor devices (e.g., 202), one or more memory elements (e.g., 204), including various subsystems, components, and modules, in some cases implemented at least in part utilizing processor devices 202 and memory elements 204, such as a controller board 206, navigation control module 208, navigation sensors 210, and data sensors 212, among potentially other examples and combinations of the foregoing. Controller board 206 can include hardware and software for controlling movement of the automated inventory data acquisition device 105. In one example, automated inventory data acquisition device 105 can be implemented as a UAV device, such as a multi-rotor helicopter device, and controller board 206 can provide the logical controls for facilitating the control of the rotors of the device, for instance, in response to one or more inputs, such as navigational directions, gyroscopic or other balancing control inputs, and so on. Controller board 206 can use the inputs to move an automated inventory data acquisition device 105 implemented as a UAV up/down, forward/backward, left/right, etc. Automated inventory data acquisition devices 105 can be implemented as ground-based robots in other implementations, with controller board 206 serving to drive operation of ground-based movement and control of the automated inventory data acquisition device 105 (e.g., controlling wheels, continuous tracks, etc.), among other potential examples. Inputs utilized by controller board 206 to control movement of the automated inventory data acquisition device 105 (e.g., within a retail facility in which retail management tasks are to be performed), in some implementations, can be provided by a navigation control module 208. Navigation control module 206 can utilize location map data stored persistently in local memory of the automated inventory data acquisition device 105 together with position sensors carried on board the device, or provided to the automated inventory data acquisition device 105 by another source, such as through instructions received over the network 125 from the location assistance system 115. In some cases navigation information can be included in, identifiable from, or otherwise correspond to mission data 216 received or otherwise accessed by the automated inventory data acquisition device 105.

Mission data 216 can identify the retail management tasks that are to be performed by the automated inventory data acquisition device 105. Tasks can involve the gathering of data by the automated inventory data acquisition device 105 from particular locations of the retail establishment or space to describe the features, status, condition, and other attributes of a particular fixture, promotional or marketing display, inventory, etc. A mission can include one or more tasks that are to be performed by the automated inventory data acquisition device 105. The tasks in a mission can be performed at a single location or at multiple, different locations within the retail or warehouse space. Accordingly, mission data 216 can include data to be used as an input to navigational control module 208 and/or controller board 206 for guiding the device's 105 movement to the one or more locations of the space where the tasks are to be performed. Additionally, mission data can identify the various data that is to be collected by the automated inventory data acquisition device 105, for instance, using one or more of the various data sensors 212 provided on the automated inventory data acquisition device 105. Such data sensors 212 can include, for example, a camera or other visual imaging sensor (e.g., a bar code scanner), ultrasound or other echolocation sensors, infrared imaging sensors, radio frequency identifier (RFID) scanners, touch sensors, among other examples. The automated inventory data acquisition device 105 can include additional sensors, as well as, in some cases, at least some of the data sensors 212, for use as navigation sensors 210 to assist the automated inventory data acquisition device 105 in navigating the layout of the retail space as well as obstacles the automated inventory data acquisition device 105 may encounter within the retail space. For instance, navigation sensors 210 can include echolocation sensors, GPS receivers, RFID scanners, visual imaging sensors, radio frequency distance measuring equipment (DME), barometers (or other elevation indicator) for use in identifying or confirming the location of the automated inventory data acquisition device 105 within a facility, as well as other sensors for use in facilitating navigation, feedback and control of the automated inventory data acquisition device 105, such as air and ground speed indicators, accelerometers, magnetometers (e.g., compasses), gyroscopes, and so on.

An automated inventory data acquisition device 105 can identify a task in mission data 216 and further receive, identify, or otherwise access location information corresponding to the task to automatically transport itself to a particular location within a store or other retail space, and utilize one or more of its data sensors 212 to collect data concerning the location in connection with the identified task. The data can be aggregated or otherwise saved as result data 214 to be returned for use in analyzing the findings of the task. In some cases, location assistance system 115 can operate cooperatively with the automated inventory data acquisition device 105 to facilitate navigation of the automated inventory data acquisition device 105 to a location in connection with one or more tasks. While some examples described herein may describe location assistance system 115 as provided remote from automated inventory data acquisition device 105, in some implementations, at least a portion of the functionality of location assistance system 115 can be provided on the automated inventory data acquisition device 105 itself (e.g., through programs 218), or in some cases, in connection with another system, such as an inventory management system (e.g., 120) remote from the automated inventory data acquisition device 105, among other potential examples.

In one example, location assistance system 115 can include one or more processor devices (e.g., 220), one or more memory elements (e.g., 222), including various subsystems, components, and modules, in some cases implemented at least in part utilizing processor devices 220 and memory elements 222, such as communication engine 224, navigation engine 226, mission control module 228, and result manager 230, among potentially other examples and combinations of the foregoing. In one example, communication engine 224 can facilitate communication between location assistance system 115 and one or more automated inventory data acquisition devices 105 to be deployed within a retail space. In some examples, multiple automated inventory data acquisition devices (e.g., 105) can be deployed and managed concurrently within a retail space, the "swarm" of automated inventory data acquisition devices performing multiple concurrent retail management tasks. Communication engine 224 can also facilitate communication with inventory management system 120. In some instances, retail management tasks to be performed by automated inventory data acquisition devices at a particular retail site can be based on or defined in connection with broader retail management objectives, such as store- or company-wide inventory management tasks, and so on. For instance, mission data 234 can be obtained from or based on information received or otherwise accessed from inventory management system 120, as well as task data 236 defining established tasks that are to be performed and included in missions (e.g., defined in mission data 234) among other examples.

Location assistance system 115 can provide location assistance to one or more automated inventory data acquisition devices 105, for instance, using navigation engine 226. Layout data 232 can be used in connection with the navigation assistance provided through navigation engine 226. Layout data 232 can describe the floor plan and three-dimensional layout of a retail site, including the location of aisles, shelves, racks, freezers, refrigerators, display cases, and so on. Navigation engine 226 can use layout data 232 to direct automated inventory data acquisition devices (e.g., 105) to locations of a retail site corresponding to tasks included in mission data utilized by the automated inventory data acquisition device 105, among other potential examples.

When more than one automated inventory data acquisition device 105 is deployed within a retail space, the devices can function as one or more groups that behave as coordinated "swarms" performing multiple concurrent retail management tasks. Coordination amongst the devices in a given swarm can be provided by a central navigational controller that provides both guidance for the completion of the retail management task, and also to ensure that the task completion tactics of the swarm are synchronized to avoid interference, redundant work, or collisions between devices. Such collision avoidance schemes can also be implemented as part of the on-board mission and flight control logic, using inputs from sensors, for example, ultrasonic echolocation modules, providing information on the presence of and distances to other devices in the vicinity.

Automated inventory data acquisition devices (e.g., 105) can be implemented to employ any one of a variety of navigational technologies to navigate a retail site and obstacles within the site. Accordingly, navigation engine 226 can be implemented using such technologies to provide navigational assistance in accordance with the capabilities of the automated inventory data acquisition device 105, itself. For example, in the case of a navigation system to employ DME-based navigation, navigation engine 226 can include Radio Frequency DME transmitters at certain locations in a facility for use in connection with a DME receiver carried on board the automated inventory data acquisition device 105. In some implementations, navigation control logic can be provided predominantly on board the automated inventory data acquisition device 105 and location assistance system 115 can provide additional corroborating location information to the automated inventory data acquisition device 105. Location assistance system 115 can also assist, in such implementations, by monitoring the automated inventory data acquisition device's (105) navigation and identifying adjustments to be made to the navigation path, for instance, in connection with an identified obstacle or other event. Such revised navigational instructions or coordinates can be communicated to the automated inventory data acquisition device 105 using communication engine 224 and network 125 for processing at the automated inventory data acquisition device 105, among other examples.

Mission controller 228 can be used to provide mission data 216 to automated inventory data acquisition device 105. As new missions are assigned to an automated inventory data acquisition device 105 or changes to existing mission data are identified, mission controller 228 can generate mission data 234 and provide the mission data to the automated inventory data acquisition device 105. In some instances, automated inventory data acquisition device 105 can have a home station when not in operation and the home station can include functionality for synching the automated inventory data acquisition device 105 to the mission controller 228 to provide the automated inventory data acquisition device 105 with mission data for use in the next mission(s) to be performed by the automated inventory data acquisition device 105. Such a home base can also include other functionality, such as a recharge station. In other instances, mission data 216 can be provided to the automated inventory data acquisition device 105 while the automated inventory data acquisition device 105 is in operations, such as via a wireless communication channel (e.g., of network 125), among other potential examples.

Mission controller 228 can also be utilized to generate mission data (e.g., 216, 224) for distribution to one or more automated inventory data acquisition devices (e.g., 105) capable of being deployed at a retail site to perform one or more retail data acquisition tasks. Missions and corresponding mission data can be generated to include one or more tasks and task data 236 can be used to generate mission data for missions including corresponding tasks. Additionally, layout data 232 can be consulted or otherwise used in connection with the generation of mission data, such that automated inventory data acquisition devices 105 can navigate to (or be navigated to) corresponding locations of a retail site that correspond to the tasks assigned in the mission data. Mission data can also be generated, assigned and distributed to automated inventory data acquisition devices by mission controller 228 according to predefined schedules defined in schedule data 238, among other examples.

Location assistance system 115, in some implementations, can serve as a broker for result data (e.g., 214) generated and collected by automated inventory data acquisition devices from retail management tasks performed by the automated inventory data acquisition devices. For instance, a result manager 230 can identify whether a task has been completed and cause missions to be modified for an automated inventory data acquisition device (e.g., 105) based on the results, such as by causing certain tasks to be repeated or assigned to other automated inventory data acquisition devices in subsequent missions, among other examples. Additionally, a result manager 230 can map results to particular locations to which a task applied and bundle result data (e.g., 214) received from automated inventory data acquisition devices (e.g., 105) for delivery or communication to an inventory management system (e.g., 120).

In some implementations, location assistance system 115 can be provided locally at a retail site as dedicated system for the site, while in other instances, location assistance system 115 can be provided remotely, such as through cloud-based or other distributed computing systems. In one implementation, automated inventory data acquisition devices can be resident at and dedicated to a particular site, while in other instance, automated inventory data acquisition devices can be provided on an as-needed basis, such as through a service providing or leasing temporary access to the automated inventory data acquisition devices and location assistance system and its services, among other possible implementations.

In one example implementation, inventory management system 120 can include one or more processor devices (e.g., 240), one or more memory elements (e.g., 242), including various subsystems, components, and modules, in some cases implemented at least in part utilizing processor devices 240 and memory elements 242, such as a planogram manager 244, comparison engine 246, report manager 248, and user interface engine 250, among potentially other examples and combinations of the foregoing. Inventory management system 120 can be provided with functionality for consuming data obtained through tasks performed by automated inventory data acquisition devices (e.g., 105), in some cases across multiple retail sites. Result data 254 can be collected from result data (e.g., 214) generated by automated inventory data acquisition devices (e.g., 105) and used in computer-performed analyses of the result data. In some instances, result data (e.g., 214) returned from an automated inventory data acquisition device 105 can describe conditions relating to products, inventory, marketing, advertising, etc. at a particular retail site. Inventory management system 120 can, in some implementations, include functionality, such as a comparison engine 246, to compare findings of the automated inventory data acquisition devices (e.g., 105) with expected or ideal conditions for the retail site. In one particular example, planograms can be defined for various fixtures within various retail sites and planogram data 252 can be defined to embody or define the planograms. A planogram manager 244 can be utilized to define planogram data. The planogram data 252 can describe the expected layout of a particular set of shelves, fixtures, freezers, etc. or promotional display within a retail site. Planogram data 252, in one example, can be compared (e.g., using comparison engine) against real world finding described in result data 254 to determine whether a corresponding real world fixture is in compliance with the planogram or not. Additionally, missing, misplaced, or out-of-stock inventory and other information can also be identified from the comparison with the planogram data 252, in some instances. Other comparisons and analyses of the result data 254 can also be performed to identify open-box or damaged merchandise, decreased or exhausted inventory stock, among other conditions within a retail site.

Analyses of result data 254 performed by comparison engine 246 and other analytic modules and logic of inventory management system 120 can be utilized to generate (e.g., using plan, report, and action managers 248) various outputs including plans, directives, exception resolution actions, reports and report data 256 based on the findings of the automated inventory data acquisition devices (e.g., 105). For example, cycle counts can be determined from result data returned from automated inventory data acquisition devices at a particular retail site. These outputs can reflect findings at a fixture-, retail-site-, or even multi-retail-site-basis, and are reported directly, but also available as inputs to other retail processes.

In one example, retail management missions can be assigned to be performed by automated inventory data acquisition devices (e.g., 105) while a retail site is closed. Corresponding retail management tasks can be performed and results obtained from the tasks to generate one or more reports that can be provided to retail site employees when they arrive again (e.g., the next morning). Report data 256 can thus, in some implementations, additionally identify events and actions that should be taken (e.g., by human staff) to correct issues identified by the automated inventory data acquisition devices 105 in conjunction with analytics performed using inventory management system 120, such as replenishment order generation, shelf restocking, replacement of damaged merchandise, rearranging shelves or promotional displays and signage to be in compliance with plans and directives (e.g., a defined planogram), among other potential uses and examples. A user interface engine 250 can be provided to present such alerts, events, and action items to a user, as well as present other result data 256 based on retail management tasks performed by one or more automated inventory data acquisition devices (e.g., 105) at one or more retail sites. Additionally, user interfaces provided by user interface engine 250 can permit users to define retail management tasks, missions, analytics, planograms, etc. to be considered or used in connection with the operation of one or more of automated inventory data acquisition device 105, location assistance system 115, inventory management system 120, etc.

Figure 3:
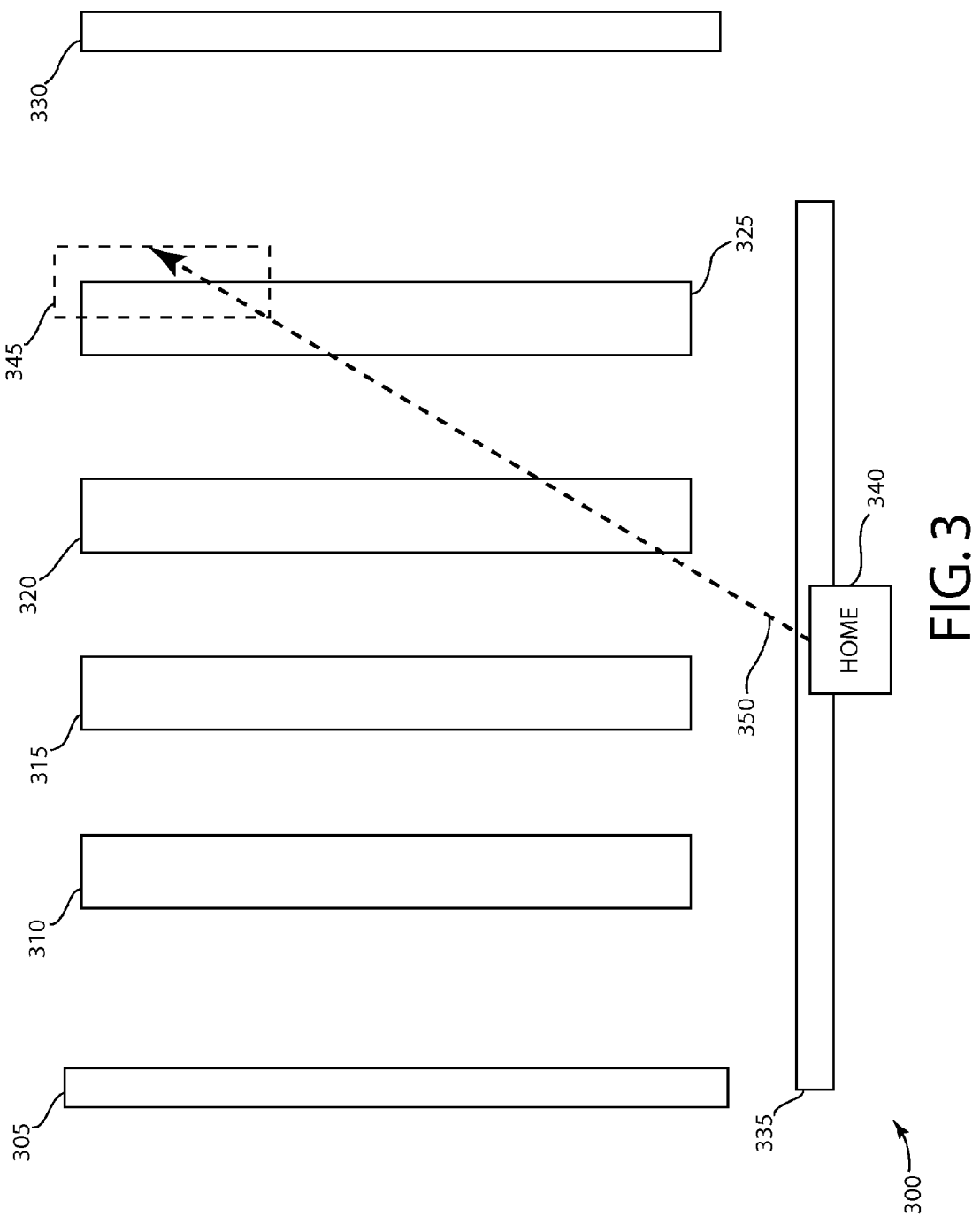
FIG. 3 is a diagram illustrating a schematic of an overhead view of a floor plan or layout of a retail site according to at least one example embodiment.

Turning now to the example of FIG. 3, a schematic of an overhead view 300 of a floor plan or layout of a retail site, such as a grocery store or department store is represented. Various fixtures present in the retail store, such as clothing racks, shelves, etc. are represented by blocks 305, 310, 315, 320, 325, 330, 335, 340. In the example of FIG. 3, a home base 340 is provided for one or more automated inventory data acquisition devices (e.g., 105) that are to perform automated retail management tasks within the retail site. A particular retail management task (or mission including the task) can be assigned to a particular automated inventory data acquisition device, the task corresponding to the gathering of information about a particular location (e.g., 345) of the retail site. The automated inventory data acquisition device can receive data identifying the task and the location at which the task is to be performed. Location information corresponding to the task can be processed by navigation controls at the automated inventory data acquisition device and/or a navigation controller remote from the automated inventory data acquisition device and directing or assisting navigation of the automated inventory data acquisition device to navigate the automated inventory data acquisition device to the location.

FIG. 3 represents a flight path 350 determined for an automated inventory data acquisition device implemented as a UAV device based on location information corresponding to a task assigned to the automated inventory data acquisition device. The automated inventory data acquisition device can navigate (or be navigated) to a particular location (e.g., 345) along path 350. Upon completion of the task, the automated inventory data acquisition device can then be navigated back to a home base or home position (e.g., 340) along a similar or different path. In some implementations, the automated inventory data acquisition device may be directed to and navigate to another location for one or more other retail management tasks before returning to home 340. In implementations utilizing a UAV implementation of an automated inventory data acquisition device, the path 350 can proceed over fixtures (e.g., 320, 325) to the target location 345. Additionally, intelligence can be gleaned by the automated inventory data acquisition device from overhead views of the fixtures (e.g., 305, 310, 315, 320, 325, 330, 335, 340).

Figure 4:
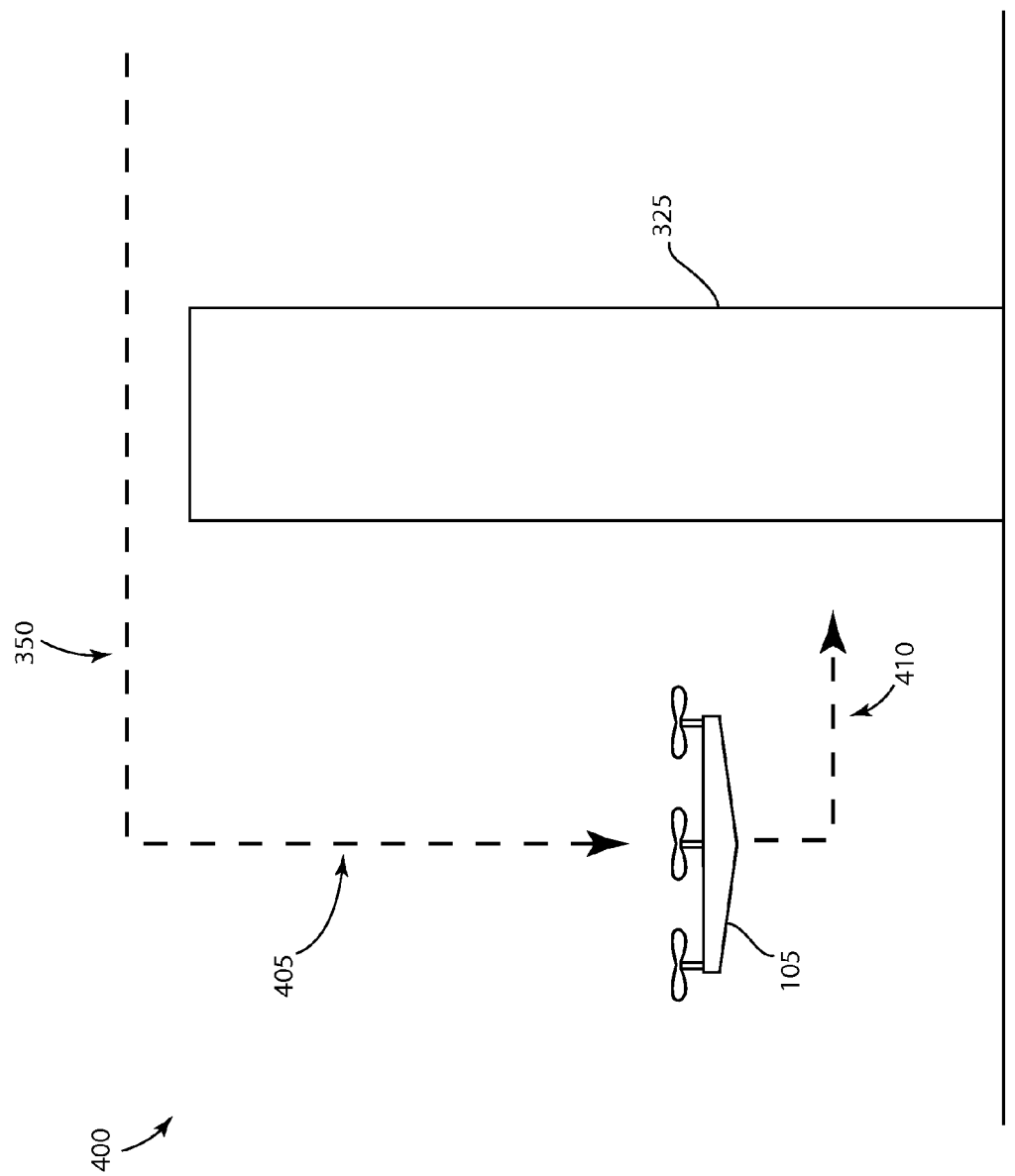
FIG. 4 is a diagram illustrating a side view of a fixture according to at least one example embodiment.

FIG. 4 represents a side view 400 of fixture 325. In addition to moving to a particular location 345, location information for a task can further involve determining the elevation at which a task is to be performed (e.g., at a particular shelf in a shelving unit) as well as the proximity at which the task is to be performed. As shown in the representation of FIG. 4, an example automated inventory data acquisition device 105 can navigate to a location (using flight path 350) and then descend (along path 405) to a particular defined elevation to perform one or more retail management tasks inspecting inventory, marketing materials, etc. at that elevation and location. Further, some sensors provided on automated inventory data acquisition device 105 may involve the automated inventory data acquisition device operating at distance closer or further from the products. Accordingly, a flight plan for the automated inventory data acquisition device 105 can specify the distance from which the automated inventory data acquisition device 105 is to operate. For instance, tasks that involve reading bar codes, detecting near field RFIDs, contacting portions of the fixture (e.g., to detect the presence of a product at a particular shelf location), etc. may involve the automated inventory data acquisition device 105 being positioned closer to the target area than tasks involving the taking of a photograph, or other tasks. Further, navigation sensors on the automated inventory data acquisition device 105 can be used to assist in positioning and orienting the automated inventory data acquisition device 105 such that the specified retail management tasks can be performed by the automated inventory data acquisition device 105.

Figure 5:
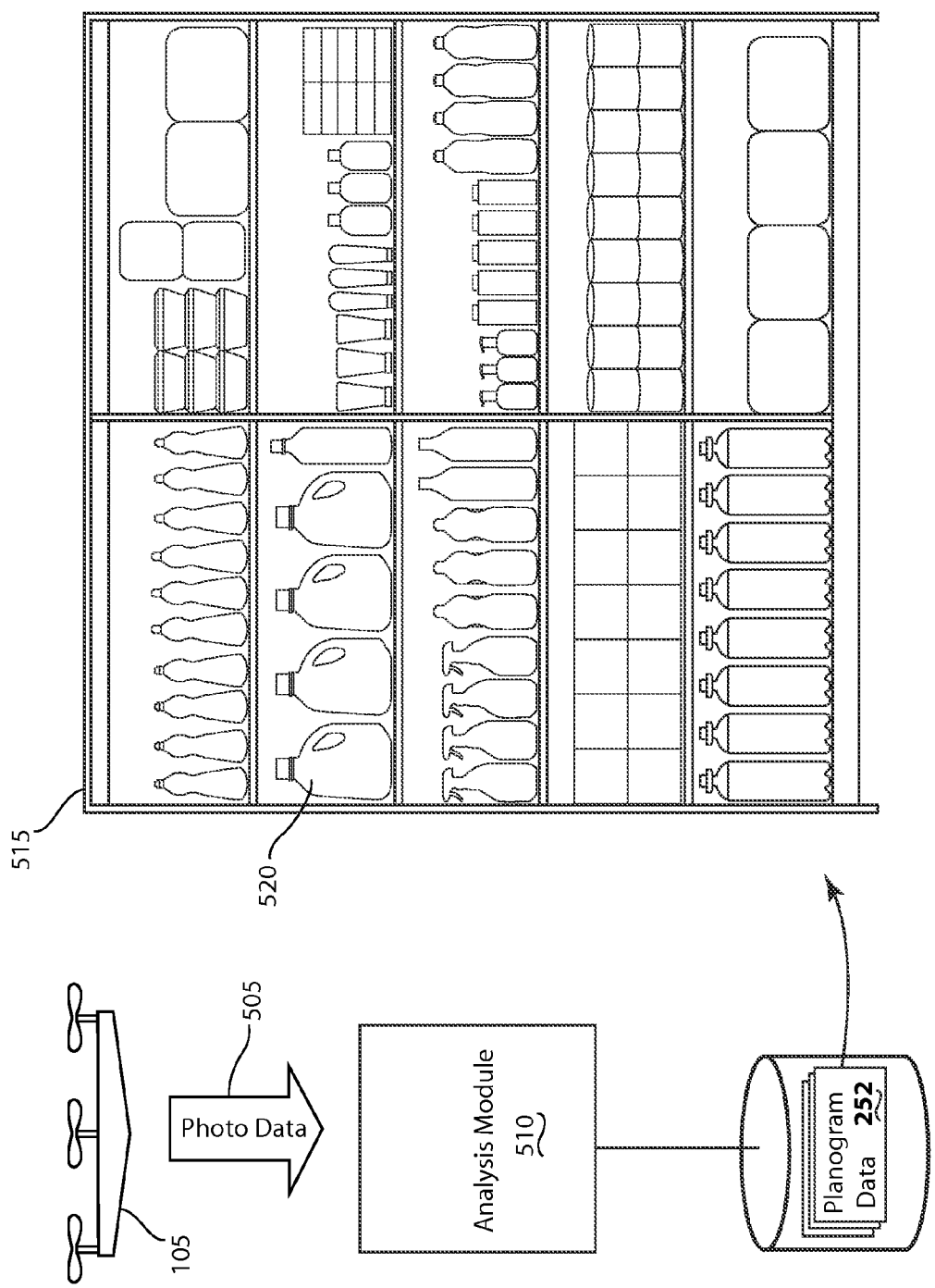
FIG. 5 is a diagram illustrating a front view of a fixture and information associated with an automated inventory data acquisition device according to at least one example embodiment.

Turning to FIG. 5, in some implementations, data can be gathered by an automated inventory data acquisition device 105 and compared against data that describes expected conditions of a particular fixture or area of a retail site. As introduced above, planograms and planogram data can be defined and utilized that specifies the desired layout of products, signage, advertisements, etc. on and around a fixture, such as the placement of products on various shelves of a shelving unit. In one illustrative example, an automated inventory data acquisition device 105 can be equipped with a camera or other technology for capturing data (e.g., photo data 505) that can be rendered to visualize of the real world conditions of the fixture. The photo data 505 can be processed, for instance, using image recognition techniques, to identify the presence, positioning, condition, and in some cases, the count of particular products at particular locations within a fixture. The results of the processing can identify whether, which, and how many products are placed at the fixture. Such data can then be used as inputs to a variety of retail inventory management processes, including planogramming, planogram compliance, checking and validation of shelf or fixture level signage and labeling, replenishment and allocation order planning, open box and damaged product management, shelf restocking labor and schedule planning, stock-out alerts, and so on.

As one illustrative example, this information would be compared against a planogram (e.g., 515) or data (e.g., 252) representing the planogram (e.g., 515) to determine whether the real world retail site is in compliance with the planogram. For instance, an analysis module (e.g., 510) can process the photo data for a particular location where the corresponding retail management task was performed by the automated inventory data acquisition device 105, identify planogram data 252 that corresponds to the particular location, and determine whether the real world location represented by the photo data 505 agrees with what is expected for the particular location as defined in planogram data 252. For instance, in one illustrative example, an analysis of the photo data may show that product 520 is missing from its expected position, as defined in planogram 515. Further, planogram data 252 can be further used to filter the set of data used to perform image matching or processing of photo data 505. For instance, an inventory management system may track hundreds or thousands of products that are carried within a retail site. Rather than processing photo data 505 to see if elements included in the photo data match any of the potential products, the planogram (or location information) can be used to constrain the image processing to matches of products that are expected to be in that location (e.g., as detailed in the planogram 515), among other potential techniques. This use case can be extended to include further processing of exceptions, triggered when products are not found to match any of the potential products as detailed in the planogram, to not only identify misplaced products, but also to generate corrective product move instructions to store or warehouse personnel.

Figure 6:
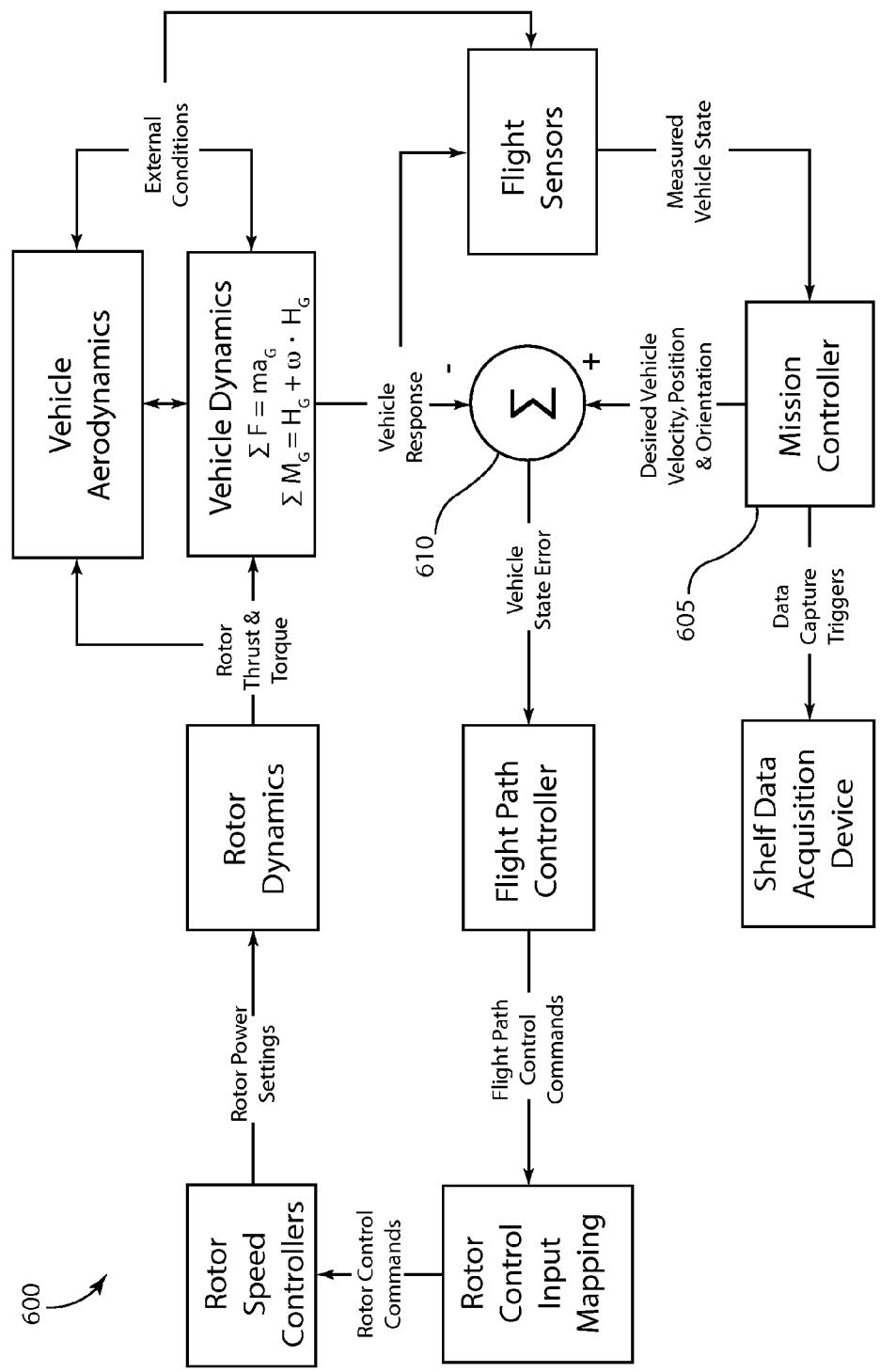
FIG. 6 is a diagram illustrating a flow diagram is shown illustrating techniques for navigating a UAV implementation of an automated inventory data acquisition device according to at least one example embodiment.

Turning now to FIG. 6, a flow diagram 600 is shown illustrating techniques for navigating a UAV implementation of an automated inventory data acquisition device. In this example, navigation and control functionality can be provided on the automated inventory data acquisition device to assist in navigating the automated inventory data acquisition device to a location within a retail site that corresponds to a particular retail management task to be performed by the automated inventory data acquisition device. A mission controller 605 of the automated inventory data acquisition device can receive inputs received from sensors on the automated inventory data acquisition device as well as from location assistance devices remote from the automated inventory data acquisition device to determine the location of the automated inventory data acquisition device relative to a target location for a particular retail management task. A feedback controller 610 can receive an indication of the desired location, position, velocity, elevation, orientation, etc. and compare the desired location to the actual location identified for the automated inventory data acquisition device and cause a flight path controller to make adjustments (e.g., through flight path control commands) influencing, for instance, rotor control inputs (e.g., in a multi-rotor UAV device), rotor speeds, and rotor dynamics. Upon determining a sufficient agreement between the real and desired location for the automated inventory data acquisition device, mission controller 605 can trigger performance of the corresponding retail management task, such as the capturing of data identifying which or how many products are present, whether a promotional display is correctly presented or constructed, whether merchandise is damaged and/or in the correct location, among other information. Data captured by the automated inventory data acquisition device can then be provided to an inventory management system to assess compliance by a department, store, or company, identify action items for store personnel, among other results.

Modern GPS systems have made automated navigation simpler for a variety of applications. However, traditional cost-effective GPS systems can struggle to provide the precision to allow for many retail management tasks (e.g., involving data collection at precise locations within a store. Further, many retail sites are indoors, and traditional GPS systems can be limited in their ability to accurately function indoors or in environments (such as department stores) that have multiple levels or floors. In some implementations, other navigation technologies can be used that are more suitable for indoor applications, providing sufficient precision and accuracy under typical in-facility conditions.

Figure 7:
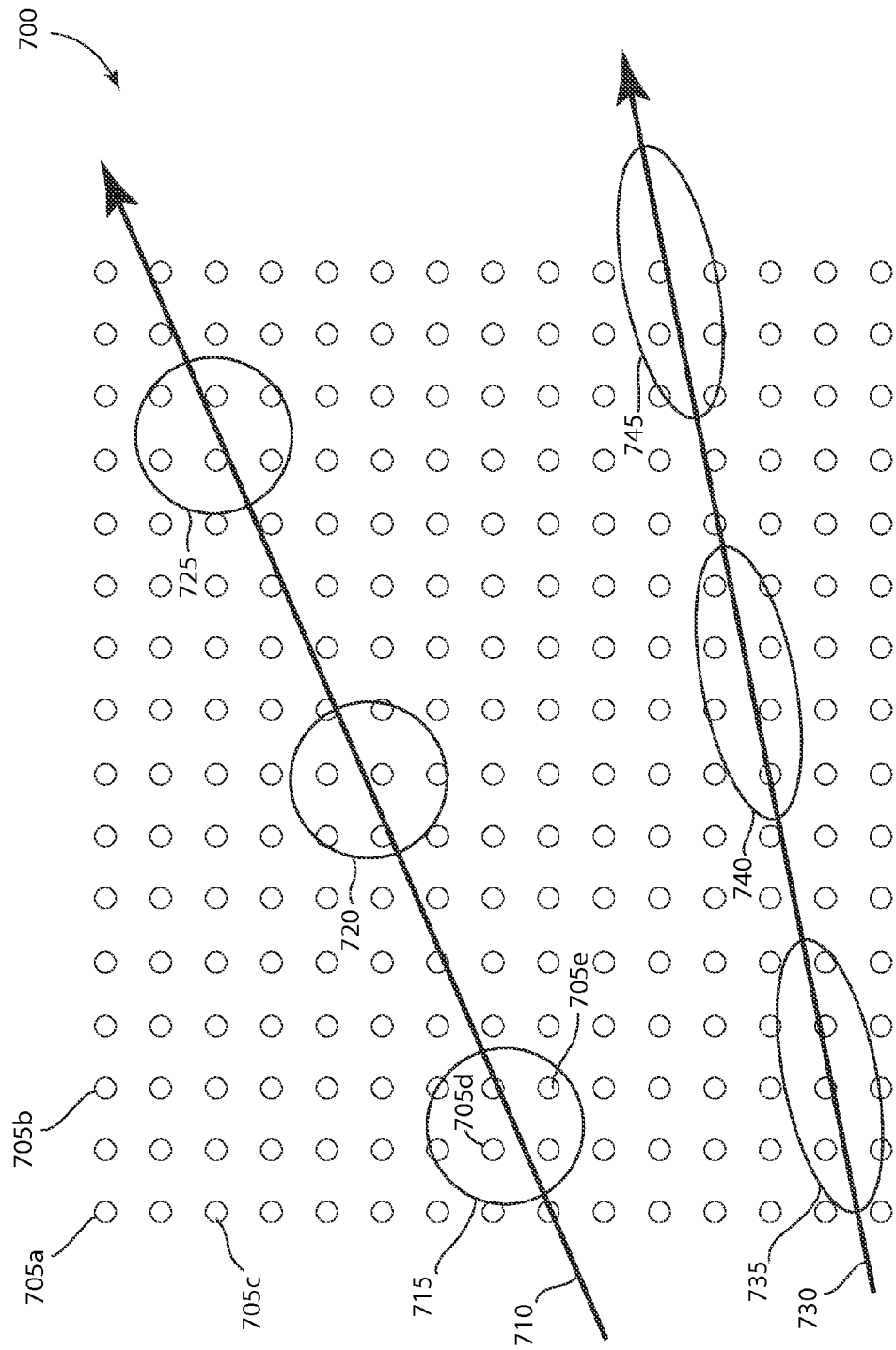
FIG. 7 is a diagram illustrating navigation of an automated inventory data acquisition device according to at least one example embodiment.

Turning to FIG. 7, in one implementation, RFID technology can be utilized to facilitate navigation of an automated inventory data acquisition device. FIG. 7 illustrates a grid (or potentially other pattern or layout) of RFID tags (e.g., 705a-e) placed within a retail site. In one example, RFID tags can be placed on top of fixtures or on the ceiling of the retail site. In other examples, RFID tag can be placed on support structures, the sides of fixtures, on or under flooring, among other examples. The view 700 of FIG. 7 is a top view of a grid of RFID tags (e.g., 705a-e) placed within a retail site. The RFID tags (e.g., 705a-e) can be either passive or active.

An automated inventory data acquisition device can be equipped with an RFID reader device that utilizes the RFID tag field (e.g., 705a-e) to identify its general location within the retail site. The reader of the automated inventory data acquisition device can periodically emit an interrogator signal that causes only a portion of the RFID tags (e.g., 705a-e) (i.e., those in within read range of the automated inventory data acquisition device) to be activated and emit their respective identification signals. The automated inventory data acquisition device can receive the identification signals of a subset of the RFID tags (e.g., 705a-e), identify which RFID tags (e.g., 705a-e) are in nearest proximity (i.e., within read range) from the unique tag identifier signals and reference a map of the RFID tags (e.g., 705a-e) to a corresponding location in the retail site. As an example, an automated inventory data acquisition device can move along a first path 710 and periodically emit an interrogator signal. At a first instance, the automated inventory data acquisition device's interrogator signal may activate a grouping of RFID tags (e.g., 705d, 705e) in area 715. In response, the automated inventory data acquisition device can determine that it is located in area 715 by mapping the identifiers of the responding RFID tags (within, for example, the circle of 715). At a second instance, the automated inventory data acquisition device's interrogator signal may awaken a second grouping of RFID tags along path 710 in area 720. In response, the automated inventory data acquisition device can determine that it is located in area 720 by mapping the identifiers of the responding RFID tags (within, for example, the circle of 720) and identify that these correspond to the region 720, and so on. Other sensors of the automated inventory data acquisition device, such as accelerometers, a compass (magnetometer), and so on can be utilized to corroborate the inferences made using the RFID queries, in some cases adjusting the flight path of the automated inventory data acquisition device in response to determining the path it takes as it moves from location 715, to location 720, to location 725, and so on. A further example, illustrated in FIG. 7, shows that the set of tags activated may be non-symmetrical based on the properties of the RFID reader antenna. The directional properties of the antenna would be accounted for in the data processing logic in order to enhance the accuracy of the position estimate derived from the set of responding tags.

Other RFID based navigation systems can be based, for example, on an on-board multi-channel RFID system equipped with a multi-axis antenna. Information on the distance between the inventory acquisition device and a given tag would be inferred from the lag between the transmitted and received radio signals, and direction to the tag location would be inferred from the relative strength of the response signal received by each of the antennas. The position of the automated inventory data acquisition device would consequently be inferred to be the point at which radials from each activated tag to the automated inventory data acquisition device are estimated to intersect.

As noted above, other navigation sensors can be utilized by an automated inventory data acquisition device in addition to its RFID reader interacting with a grid of RFID tags for use in assisting with position sensing. Moreover, velocity (speed and direction of movement) of the automated inventory data acquisition device can be estimated based on the time rate of change of position estimated from the manner in which the set of responding tags changes as the automated inventory data acquisition device moves along the path, e.g., 730.

In some cases, responsive RFID tag fields (e.g., 715, 720, 725, 735, 740, 745) may intersect in that the same RFID tag responds to successive queries by the automated inventory data acquisition device's RFID reader. In cases where a plurality of RFID tags will respond to most if not all interrogator queries, these repeating responses can nonetheless be interpreted to correspond to distinct locations within a retail space as the overall area corresponding to the responding RFID tags is considered when assessing the location of the automated inventory data acquisition device from the responding RFID tags. For instance, in one example, a plurality of responsive RFID tags can be identified (e.g., corresponding to a particular field or area 715, 720, 725, 735, 740, 745) and navigation logic of the automated inventory data acquisition device can determine that its location corresponds to a certain position (e.g., the geometric center of a cluster of responding tags) relative to the identified area (i.e., not any one particular RFID tag in the field).

A navigation system utilizing a network or grid of RFID tags can include additional optional features. The RFID reader of an automated inventory data acquisition device can have a double role, in some instances, in that the reader can be used both as a navigation sensor as well as a data sensor for scanning RFID tags of pallets or products on fixtures examined by the automated inventory data acquisition device. RFID tags can also be used to mark obstructions within the retail space such as support columns and beams, ceiling elevation changes, and so on, with corresponding RFID tags marking such obstructions and obstacles with alert identifiers, among other examples.

The examples of FIG. 7, and other techniques, can allow navigation intelligence and logic to be predominantly provided on the automated inventory data acquisition devices. In this manner, navigation control can be decentralized in some cases, resulting in simpler and less costly deployment within a retail site, as more costly centralized controllers can be foregone in favor of "smarter" automated inventory data acquisition devices and robots, among other examples and alternatives.

Figure 8A:
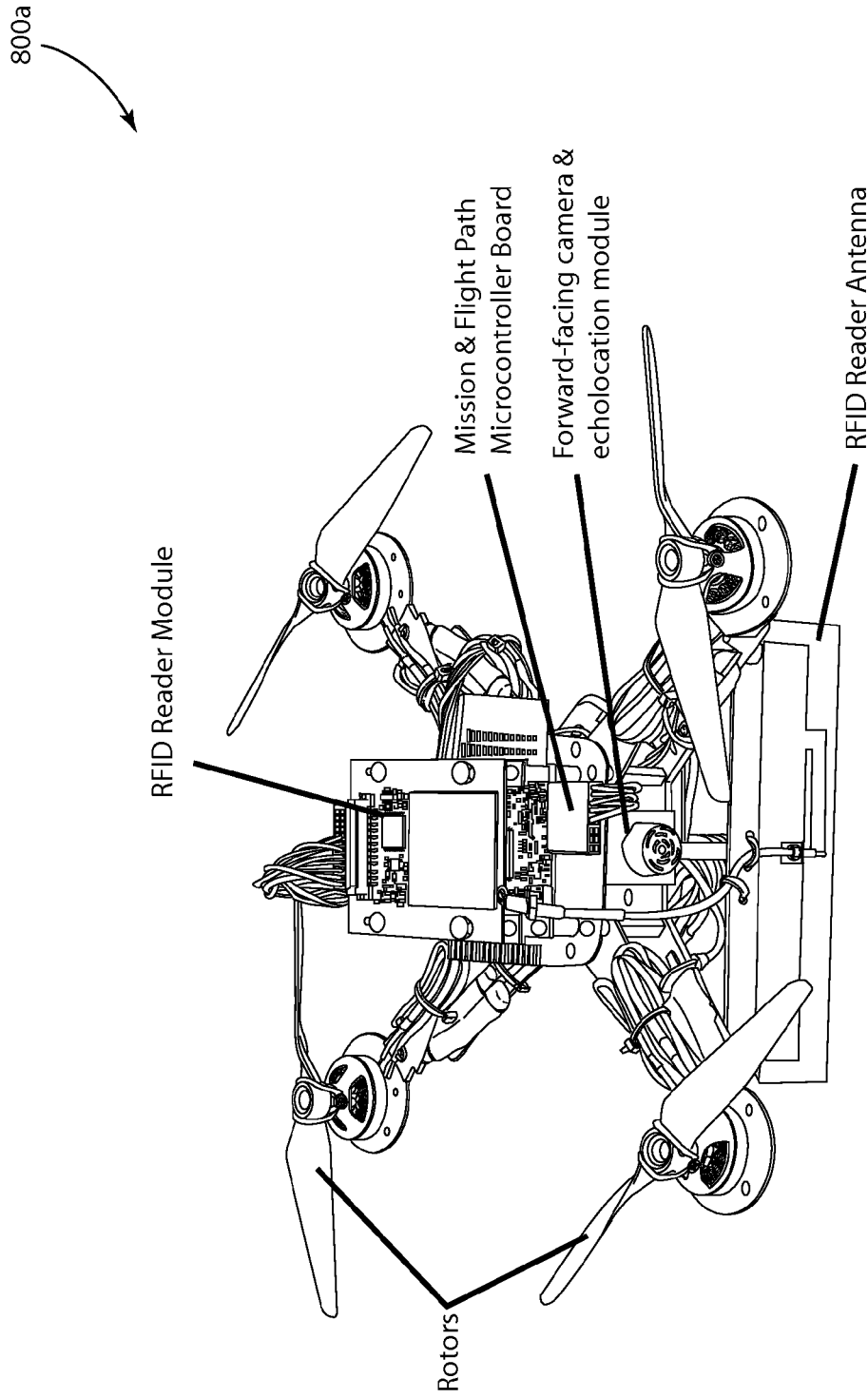
FIGS. 8A-8C are diagrams illustrating an automated inventory data acquisition device according to at least one example embodiment.
Figure 8B:
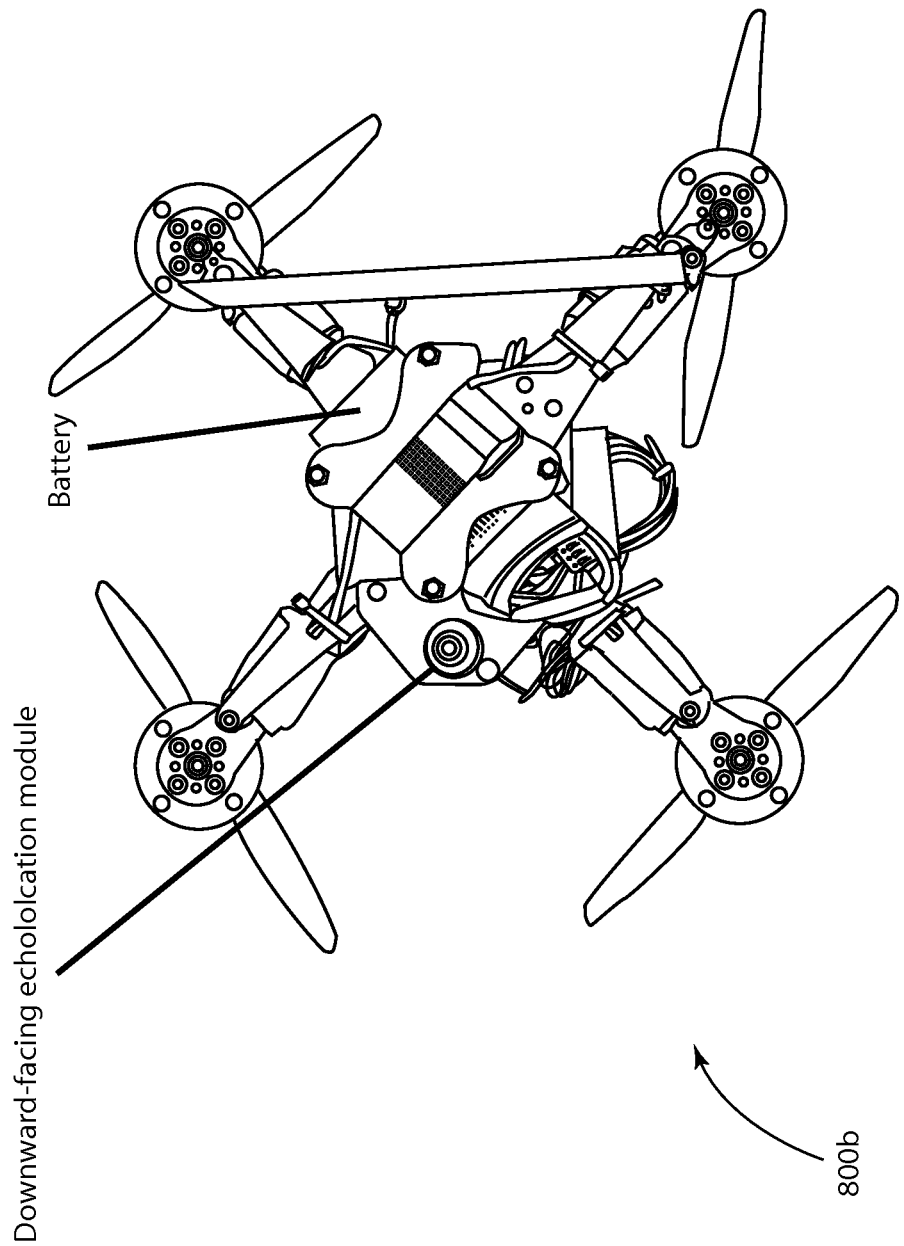
Figure 8C:
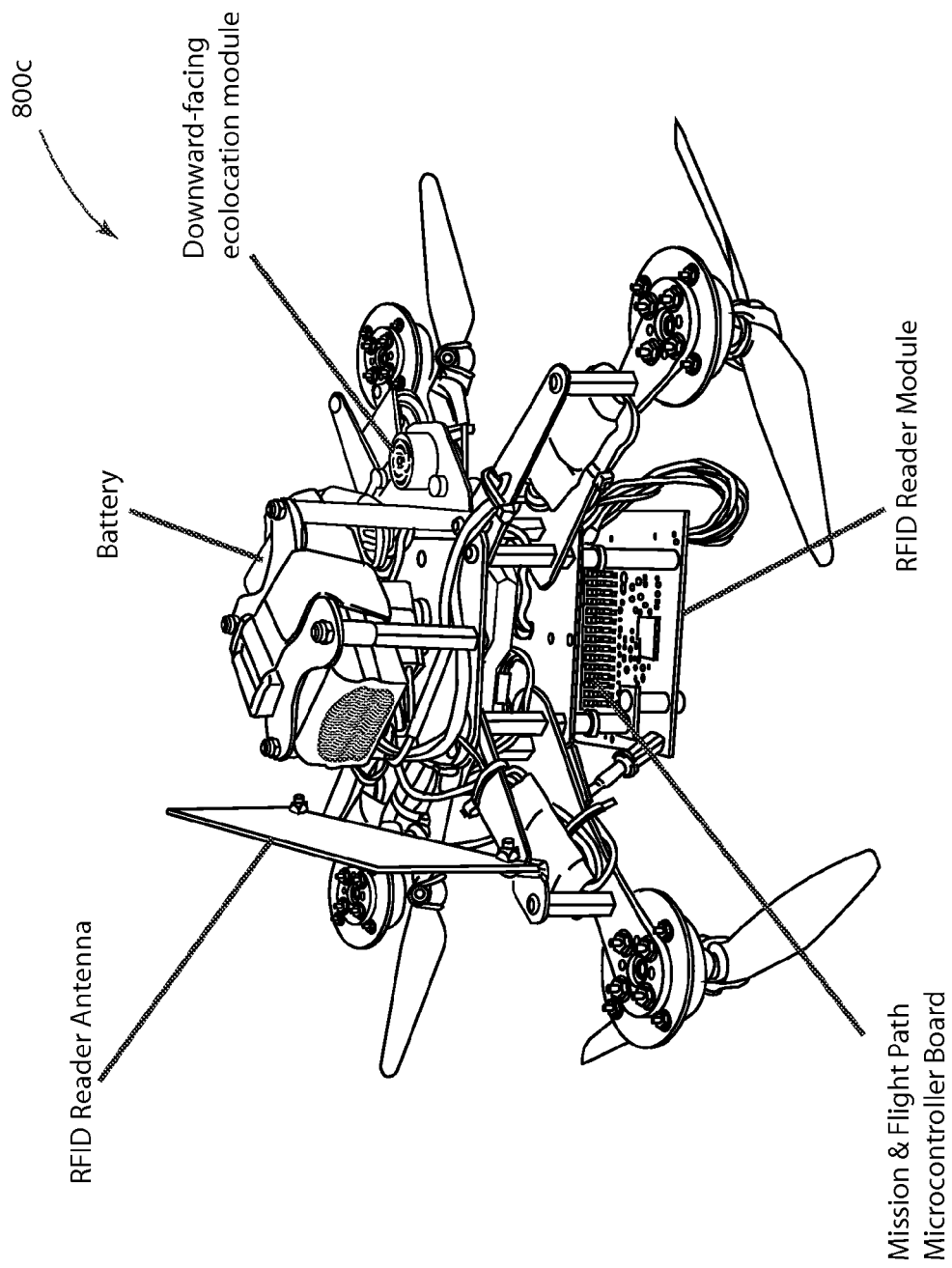

Turning to FIGS. 8A-8C, views 800a-c of an example automated inventory data acquisition device are shown. As shown, an automated inventory data acquisition device can be implemented as a multi-rotor UAV equipped with navigation and data collections sensors for navigating to locations within a retail site, hovering in a position, and performing certain retail management tasks, such as tasks supports compliance checks, inventory cycle counts, among other examples. In FIG. 8A, a view 800a is shown showing views of the rotors of the automated inventory data acquisition device, an RFID reader module, mission and flight path microcontroller board (e.g., implementing navigation and flight control), and an RFID reader antenna. FIG. 8B is a top view of the automated inventory data acquisition device, showing the positioning of an example downward-facing echolocation module (e.g., to determine changes in elevation, contours of underlying terrain, and the presence of obstacles beneath the UAV while airborne), and a battery, such as a rechargeable battery (e.g., capable of being charged at a home base configured for the UAV device. FIG. 8C is another perspective view of the example automated inventory data acquisition device.

Due to time and/or resource limitations, it may be desirable to be selective regarding evaluation of portions of a store, acquisition of data regarding portions of a store, and/or the like. For example, in some circumstances, a company may rely upon employees for acquisition of data regarding inventory state. In such circumstances, the company may have an insufficient number of employees to evaluate the entire store each time the inventory is analyzed. In another example, the company may utilize one or more automated inventory management device for acquiring data. In such circumstances, the company may have an insufficient number of automated inventory management devices to gather data regarding the entirety of the store each time data is acquired. In another example, a company may have resources to gather a large amount of data, but may have limited resources for analyzing the data. In such circumstances, the company may have limited computing power for performing analysis on the entirety of available data to identify each inventory anomaly that the data may indicate. For at least these reasons, it may be desirable for a system to selectively identify one or more portions of a store to gather data, one or more portions of data to analyze, and/or the like. In this manner, companies may be able to align their data acquisition and analysis activities with the company's available resources.

In determining which data to acquire and/or which data to analyze, it may be desirable to identify one or more objectives regarding the data acquisition and/or data analysis. For example, it may be desirable to identify one or more possible problems that may exist, and focus the data acquisition and/or analysis towards determination whether the problem actually exists. In this manner, the data acquisition and/or data analysis activities may be focused upon resolution of identified potential problems. Such a strategy may allow a company to align data acquisition and/or data analysis resource allocation with the evolving circumstances of their business so that such resource allocation may be based, at least in part, on the perceived need by the company.

In at least one example embodiment, an apparatus determines an inventory exception inference. An inventory exception inference may be an identification of a particular inventory exception that may exist. An inventory exception may be a circumstance where inventory state differs from an inventory plan. An inventory state may be particular circumstances of an inventory, such as location of one or more products, count of one or more products, arrangement of one or more products, compliance of products with an inventory plan, and/or the like. There may be an actual inventory state that identifies the inventory state as physically present at a particular time. In this manner, there may be one or more inferred inventory states that represent possible inventory states as inferred from one or more different sets of data, such that these inferred inventory states aim to predict an actual inventory state. The inventory plan may comprise information indicative of a planogram, and/or any other information that identifies a location or arrangement to which one or more products are desired to conform. For example, there may be an inventory plan that identifies intended locations for a plurality of products. In this manner, the portion of an inventory plan that applies to a particular product may be referred to as an inventory plan for the product. In at least one example embodiment, an inventory exception inference associated with a product is an identification of circumstances that indicate occurrence of a circumstance where an inventory state of a product differs from an inventory plan for the product. For example, an inventory exception inference associated with a blender may be an identification of circumstances that indicate that the inventory state of the blender differs from the inventory plan for the blender.

In at least one example embodiment, an apparatus, such as inventory management system 120 of FIG. 1 evaluates various types of data to identify circumstances that may indicate an inventory exception inference. Upon identification of such circumstances, the apparatus may cause performance of a particular operation, may cause setting of, at least part of, a data structure that memorializes the inventory exception inference, and/or the like. The data that the apparatus evaluates may be indirect inventory data. For example, the data may be information that may provide insight into the inventory state, but that fails to directly represent the actual inventory state.

In at least one example embodiment, determination of the inventory exception inference associated with a product is based, at least in part, on tracked inventory state data associated with the product. The tracked inventory state data may be data that is based, at least in part, on tracking of events that cause changes in inventory, such as performed by a perpetual inventory system. The apparatus may receive the tracked inventory state data from another apparatus, such as a database and/or a repository. The apparatus and/or a separate apparatus may determine the tracked inventory state data based, at least in part, on occurrence of various events associated with the product. For example, the apparatus may monitor for events associated with the product, such a restocking event, a sale event, a shipment event, or a discard event, and/or the like. For example, the apparatus may decrement a product count in the tracked inventory state data based, at least in part, on information indicative of a sale of the product. In this manner, the tracked inventory state data may provide a prediction of the actual inventory state based, at least in part, on the monitored events. However, in some circumstances, the actual inventory state may differ from the tracked inventory state data. For example, there may be damaged products, misplaced products, missing products, and/or the like, that the tracked inventory state data fails to indicate.

In at least one example embodiment, determination of the inventory exception inference associated with a product is based, at least in part, on sale projection data associated with the product. The sale projection data may be data that indicates an expected amount of sales of a particular product over a time period. For example, the sale projection data may indicate that a particular shirt is expected have ten sales in a week. The apparatus may receive the sale projection data from another apparatus, such a database and/or a repository.

In at least one example embodiment, the determination of the inventory exception inference associated with the product is based, at least in part, on a determination that actual sales data deviates from the sale projection data beyond a deviation tolerance. A deviational tolerance may be an amount of deviation beyond which indicate exceptional sales behavior that may indicate an inventory exception. For example, the sales projection data may indicate a projection of ninety sales of a particular toy, but the actual sales data may indicate merely ten sales of the toy. In such circumstances, the apparatus may determine that such a deviation between projected sales and actual sales indicates an inventory exception, and may determine an inventory exception inference associated with the toy. In some circumstances, the determination of the inventory exception inference associated with the product is based, at least in part, on the sales data and the tracked inventory data. For example, regarding the toy sale example, the apparatus may evaluate tracked inventory data to determine whether an inventory exception may be present. In such an example, the apparatus may fail to determine the inventory exception inference if the tracked inventory data indicates a low or zero count for the toy. Conversely, the apparatus may determine the inventory exception inference based on the tracked inventory data indicating a moderate or high count for the toy. In this manner, such sales data deviation under circumstances where the tracked inventory data indicates significant count for the product in inventory may be indicative of circumstances where the actual inventory state may differ from the inventory state reflected by the tracked inventory data.

The inventory exception inference may identify one or more inventory exceptions. For example, the inventory exception may identify a maverick product inventory exception. In at least one example embodiment, a maverick product inventory exception identifies circumstances where there may be a product that is in inventory, but is at a location that differs from the location of the product in the inventory plan. For example, the maverick product inventory exception may refer to a non-conforming product placement. In such an example, a customer may have moved the product from a compliant location to a non-compliant location. For example, a child may have picked up the product from a compliant location and may have set the product at a location that is non-compliant.

In another example, the inventory exception may identify a planogram nonconformance inventory exception. In at least one example embodiment, the planogram nonconformance inventory exception identifies circumstances where the product may be arranged in a manner that conflicts with the planogram. For example, the product may actually have less shelf space allocated than indicated by the planogram, may be placed in a manner that fails to conform with the planogram (for example, in a manner that obscures key information on the product packaging), and/or the like.

In another example, the inventory exception may identify a missing product inventory exception. In at least one example embodiment, the missing product inventory exception identifies circumstances where the product may be absent from inventory. For example, some of the products may have been stolen from inventory, may have been improperly recorded into inventory, and/or the like.

In another example, the inventory exception may identify a non-sellable product inventory exception. In at least one example embodiment, the non-sellable product inventory exception identifies circumstances where the product may be in actual inventory, but may be in a condition that frustrates sale of the product. For example, the product may have been damaged (and/or opened) by an employee, by a customer, by an environmental condition (such as a water leak, a storage malfunction, etc.), and/or the like. In another example, the product may be expired, obsolete, and/or the like.

In another example, the inventory exception may identify a presentation non-compliance inventory exception. In at least one example embodiment, the presentation non-compliance inventory exception identifies circumstances where the presentation of the product fails to comply with a planogram for the product. For example, the presentation non-compliance inventory exception may identify improper utilization of special displays (such as promotional material, end caps, special shelving, etc.), of temporary fixtures, of special fixtures, shelf labels, promotional signage, marketing materials, coupon dispensers, shelf configuration (for example, improper use of shelves, display hooks, etc.), and/or the like.

In another example, the inventory exception may identify an environmental condition inventory exception. In at least one example embodiment, the environmental condition inventory exception identifies circumstances where the product may be in actual inventory, but one or more environmental conditions that exists at the location of the product may frustrate sale of the product. For example, the product may be at a location where there is floor damage that makes navigation to the product undesirable for a customer, at a location that is uncomfortable for customers (for example, due to a water leak, improper climate control, a spill, poor sanitation, etc.), and/or the like.

In at least one example embodiment, determination of the inventory exception inference associated with a product is based, at least in part, on customer comment data associated with the product. The customer comment data may be data that is received from customer surveys, data that is mined form customer comments on internet forums, customer support comment, a customer feedback comment, a social media post and/or the like. For example, a customer may comment that a particular product was damaged at a store, may comment that a particular store was uncomfortable, may comment that a particular product appeared to be absent from inventory, and/or the like. In such circumstances, the apparatus may determine a particular inventory exception inference that corresponds with the customer comment data. For example, the apparatus may determine that a customer comment that a product appears to be absent from inventory indicates a maverick product inventory exception inference, a missing product inventory exception inference, and/or the like.

As previously described, it may be desirable to identify data to be acquired and/or evaluated based, at least in part on an inventory exception inference. In this manner, it may be desirable for an apparatus to determine an inventory inspection directive for a product that has been determined to have an associated inventory exception inference. In at least one example embodiment, the inventory inspection directive is one or more commands that instruct acquisition of inspected inventory state data for the product. The inspected inventory state data may be inventory state data that is based, at least in part on observance of the product. For example, the inspected inventory state data may be visual data associated with the product, such as visual information that includes a representation of the product (such as an image, a video, etc.), a checklist that indicates that a human observance of inventory state, visual information that includes a representation of a location associated with the product in an inventory plan, and/or the like. The inspected inventory state data may comprise one or more images of the product on a shelf, one or more partial images of the product behind a shelf facing (for example, when the view of product is limited or obscured by the unit occupying the facing, less than ideal lighting conditions, etc.), information (such as visual information) indicative of product presence and/or proper positioning of shelf labeling, and if present, information indicative of one or more pallet (for example from visual identification, RFID, etc.), information indicative of the product and/or promotional signage information (for example from visual identification, RFID, etc.), one or more images of the display and/or shelf upon which the product is stored, one or more images of aisles (including possible obstacles), information indicative of environmental conditions (such as temperature, lighting, etc.).

In at least one example embodiment, the inventory inspection directive instructs acquisition of inspected inventory state data for the product by way of deployment of a data acquisition mission to a location that is designated for the product by an inventory plan. The inventory inspection directive may be an automated inventory inspection directive, similar as described regarding FIG. 11. The inventory inspection directive may be a historical inventory inspection directive, similar as described regarding FIG. 14. The inventory inspection directive may be a manual inventory inspection directive. For example, the manual inventory inspection directive may comprise instructions configured to inform a human of the product and the location. In such an example, the inspected inventory state data may comprise information indicative of one or more observations of the human in conformance with the inventory inspection directive. The inventory state data may be data that the apparatus receives by way of user input. For example an employee may perform the data acquisition mission, and provide input, at least indirectly, to the apparatus that indicates the inventory state observed by the employee. In this manner, the inventory inspection directive may further comprise instructions configured to inform the human of the inventory exception inference. For example, the instruction may inform the human to verify whether a particular product count is present at a particular location, whether an undesirable environmental condition exists at a particular location, and/or the like. In this manner, the inventory inspection directive may provide the human with information that identifies a particular subset of issues to evaluate. It may be desirable to provide such subset identification to limit the amount of expertise and experience of the human that is relied upon for receiving useful inspected inventory state data.

Figure 9:
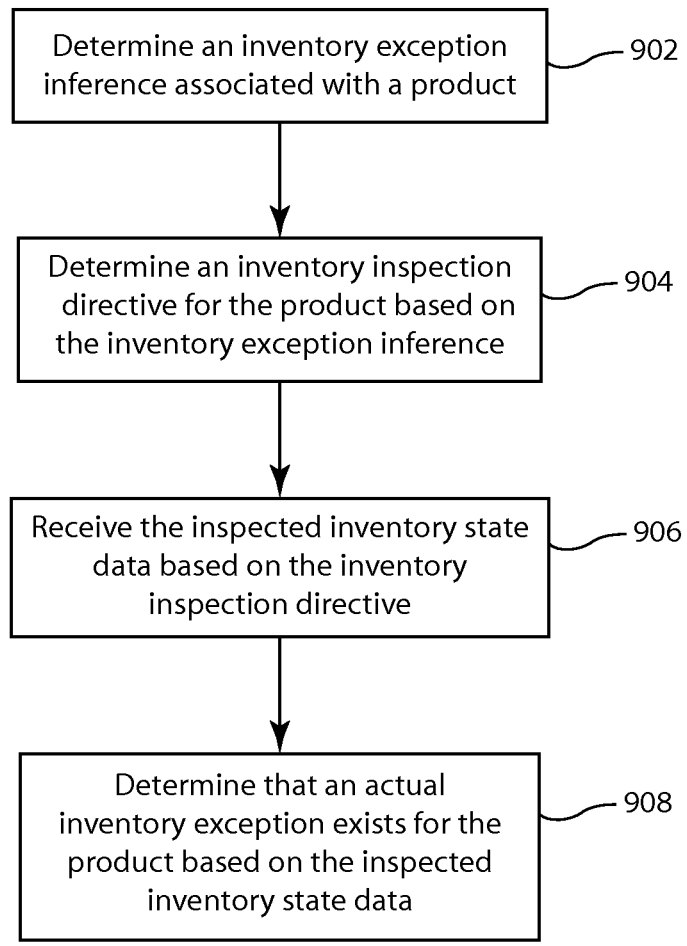
FIG. 9 is a flow diagram illustrating activities associated with an inventory inspection directive according to at least one example embodiment.

FIG. 9 is a flow diagram illustrating activities associated with an inventory inspection directive according to at least one example embodiment. In at least one example embodiment, there is a set of operations that corresponds with the activities of FIG. 9. An apparatus, for example inventory management system 120 of FIG. 1, or a portion thereof, may utilize the set of operations. The apparatus may comprise means, including, for example processor 240 of FIG. 2, for performance of such operations. In an example embodiment, an apparatus, for example inventory management system 120 of FIG. 1, is transformed by having memory, for example memory 242 of FIG. 2, comprising computer code configured to, working with a processor, for example processor 240 of FIG. 2, cause the apparatus to perform set of operations of FIG. 9.

At block 902, the apparatus determines an inventory exception inference associated with a product. As previously described, the inventory exception inference may be an identification of circumstances that indicate occurrence of a circumstance where an inventory state of the product differs from an inventory plan for the product.

At block 904, the apparatus determines an inventory inspection directive for the product based, at least in part, on the inventory exception inference. As previously described, the inventory inspection directive may be one or more commands that instruct acquisition of inspected inventory state data for the product, and the inspected inventory state data may be inventory state data that is based, at least in part on observance of the product.

At block 906, the apparatus receives the inspected inventory state data based, at least in part, on the inventory inspection directive. For example, if the inventory inspection directive is a manual inventory inspection directive, the receipt of the inspected inventory state data may be, at least indirectly, by way of user input. In another example, if the inventory inspection directive is an automated inventory inspection directive, the receipt of the inspected inventory state data may be, at least indirectly, from an automated inventory data acquisition device. In another example, if the inventory inspection directive is a historical inventory inspection directive, the receipt of the inspected inventory state data may be from memory, a repository, a database, and/or the like.

At block 908, the apparatus determines that an actual inventory exception exists for the product based, at least in part, on the inspected inventory state data. An actual inventory exception identifies circumstances where an inventory exception has been verified to exist based, at least in part, on inspected inventory state data. In this manner, the actual inventory exception may be interpreted as a validated inventory exception. In at least one example embodiment, determination that an actual inventory exception exists is further based, at least in part, on the inventory exception inference. For example, the apparatus may evaluate the inspected inventory state data based on a particular inventory exception inference differently than when based on a different inventory exception inference. For example, the apparatus may perform evaluation similarly as described regarding blocks 1408 and 1410 of FIG. 14 based, at least in part, on a maverick product inventory exception inference, and may perform evaluation based on visual comparison based, at least in part, on a presentation non-conformance inventory exception inference. In another example, the apparatus may examine the inspected inventory state data to identify at least part of the inspected inventory state data that indicates presence of the inventory exception inference. For example, the inspected inventory state data may comprise visual information of the location of the product. In such circumstances, the apparatus may evaluate the visual information to identify a portion of the visual information that indicates existence of circumstances that correspond with the inventory exception inference. For example, the inventory exception inference may be a presentation non-compliance inventory exception. In such an example, the apparatus may evaluate the visual information to determine whether the visual information corresponds with the planogram for the product. In such an example, the apparatus may determine existence of an actual inventory exception based on a determination that the visual information comprises information that indicates lack of compliance with the planogram.

Figure 10:
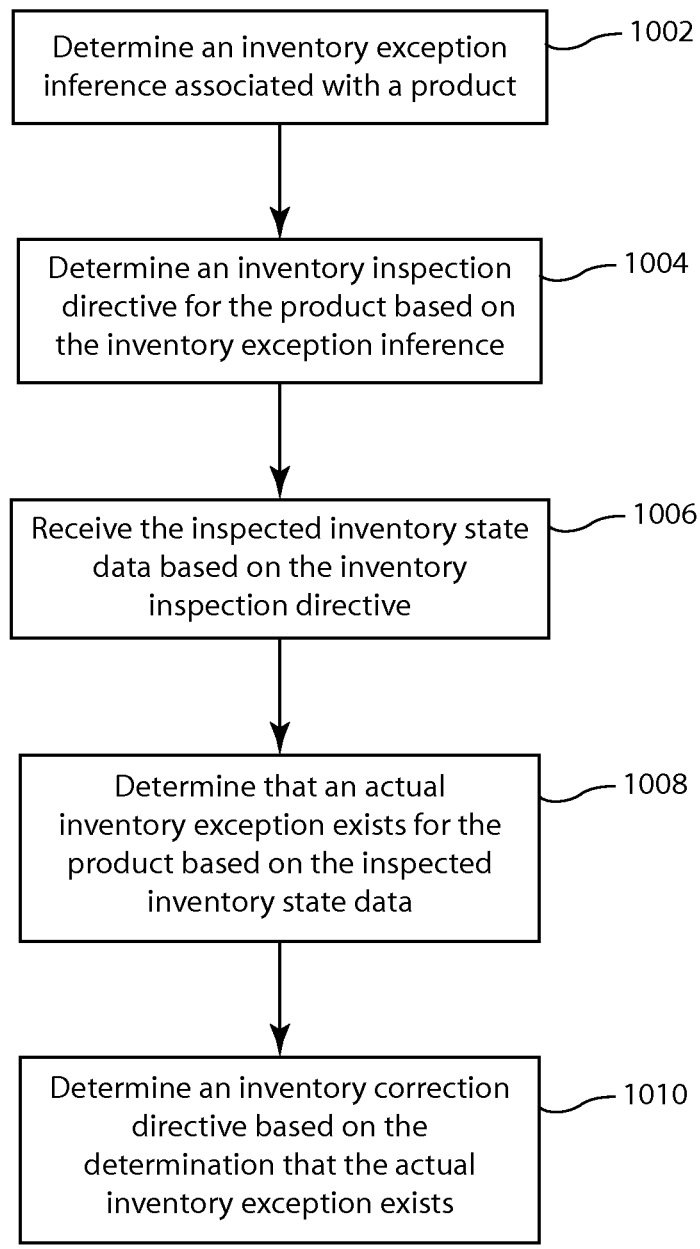
FIG. 10 is a flow diagram illustrating activities associated with an inventory inspection directive according to at least one example embodiment.

FIG. 10 is a flow diagram illustrating activities associated with an inventory inspection directive according to at least one example embodiment. In at least one example embodiment, there is a set of operations that corresponds with the activities of FIG. 10. An apparatus, for example inventory management system 120 of FIG. 1, or a portion thereof, may utilize the set of operations. The apparatus may comprise means, including, for example processor 240 of FIG. 2, for performance of such operations. In an example embodiment, an apparatus, for example inventory management system 120 of FIG. 1, is transformed by having memory, for example memory 242 of FIG. 2, comprising computer code configured to, working with a processor, for example processor 240 of FIG. 2, cause the apparatus to perform set of operations of FIG. 10.

In some circumstances, it may be desirable to provide information that allows for correction of an actual inventory exception. For example, the actual inventory exception may be an actual maverick product inventory exception. In such an example, it may be desirable to provide instructions that allow a human to locate the maverick product and place the maverick product in conformance with the inventory plan. In another example, the actual inventory exception may be an actual environmental condition exception. In such an example, it may be desirable to provide instructions for correction of the environmental condition, such as adjusting a temperature, cleaning an aisle, and/or the like.

At block 1002, the apparatus determines an inventory exception inference associated with a product, similarly as described regarding block 902 of FIG. 9. At block 1004, the apparatus determines an inventory inspection directive for the product based, at least in part, on the inventory exception inference, similarly as described regarding block 904 of FIG. 9. At block 1006, the apparatus receives the inspected inventory state data based, at least in part, on the inventory inspection directive, similarly as described regarding block 906 of FIG. 9. At block 1008, the apparatus determines that an actual inventory exception exists for the product based, at least in part, on the inspected inventory state data, similarly as described regarding block 908 of FIG. 9.

At block 1010, the apparatus determines an inventory correction directive based, at least in part, on the determination that the actual inventory exception exists. The inventory correction directive instructs correction of an actual inventory exception. The inventory correction directive may comprise instructions configured to inform a human of the one or more actions to perform to, at least partially, address an actual inventory exception. For example, the inventory correction directive may comprise a checklist of actions for an employee to perform, such as to remove an obstruction, to reconfigure a shelf, to replace promotional material, to order missing products, and/or the like.

Figure 11:
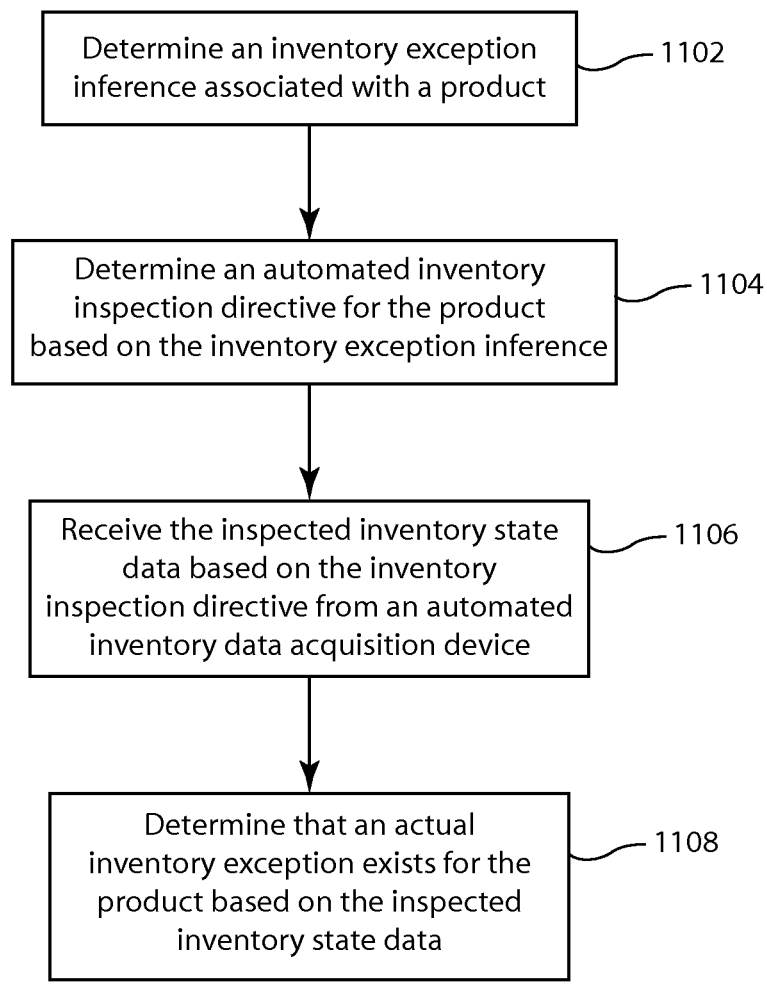
FIG. 11 is a flow diagram illustrating activities associated with an inventory inspection directive according to at least one example embodiment.

FIG. 11 is a flow diagram illustrating activities associated with an inventory inspection directive according to at least one example embodiment. In at least one example embodiment, there is a set of operations that corresponds with the activities of FIG. 11. An apparatus, for example inventory management system 120 of FIG. 1, or a portion thereof, may utilize the set of operations. The apparatus may comprise means, including, for example processor 240 of FIG. 2, for performance of such operations. In an example embodiment, an apparatus, for example inventory management system 120 of FIG. 1, is transformed by having memory, for example memory 242 of FIG. 2, comprising computer code configured to, working with a processor, for example processor 240 of FIG. 2, cause the apparatus to perform set of operations of FIG. 11.

As previously described, an inventory inspection directive may be an automated inventory inspection directive. In at least one example embodiment, an automated inventory inspection directive comprises instructions configured to identify the product and the location as, at least part of, mission data for an automated inventory data acquisition device. For example, the automated inventory inspection directive comprises instructions configured to cause the automated inventory data acquisition device to embark on a mission in accordance with the inventory inspection directive.

In at least one example embodiment, the apparatus receives the inspected inventory state data (directly or indirectly) from the automated inventory data acquisition device. As previously described, the inspected inventory state data may comprise visual information acquired by the automated inventory data acquisition device. In at least one example embodiment, determination that an actual inventory exception exists comprises determination that the visual information of the inspected inventory state data indicates non-conformance with an inventory plan. For example, the apparatus may determine that such non-conformance is indicative of an actual non-sellable product inventory exception, an actual missing product inventory exception, an actual planogram nonconformance inventory exception, and/or the like. For example, the apparatus may determine a subset of the visual information based, at least in part, on the inventory exception inference, and the determination that the visual information indicates non-conformance with the inventory plan fails to include visual information beyond the subset of the visual information. In such an example, the inventory exception inference may be a missing product exception inference, and the subset of the visual information may correspond with visual information at the location for the product as specified by the inventory plan. In such an example, the apparatus may determine that absence of a visual representation of the product in the subset of the visual information indicates an actual missing product inventory exception.

At block 1102, the apparatus determines an inventory exception inference associated with a product, similarly as described regarding block 902 of FIG. 9.

At block 1104, the apparatus determines an automated inventory inspection directive for the product based, at least in part, on the inventory exception inference. The apparatus may send the automated inventory inspection directive to an automated inventory inspection device. The apparatus may cause the automated inventory inspection device to embark upon a mission to acquire inspected inventory state data in conformance with the inventory inspection directive.

At block 1106, the apparatus receives, from the automated inventory inspection device, the inspected inventory state data based, at least in part, on the inventory inspection directive. At block 1108, the apparatus determines that an actual inventory exception exists for the product based, at least in part, on the inspected inventory state data.

Figure 12:
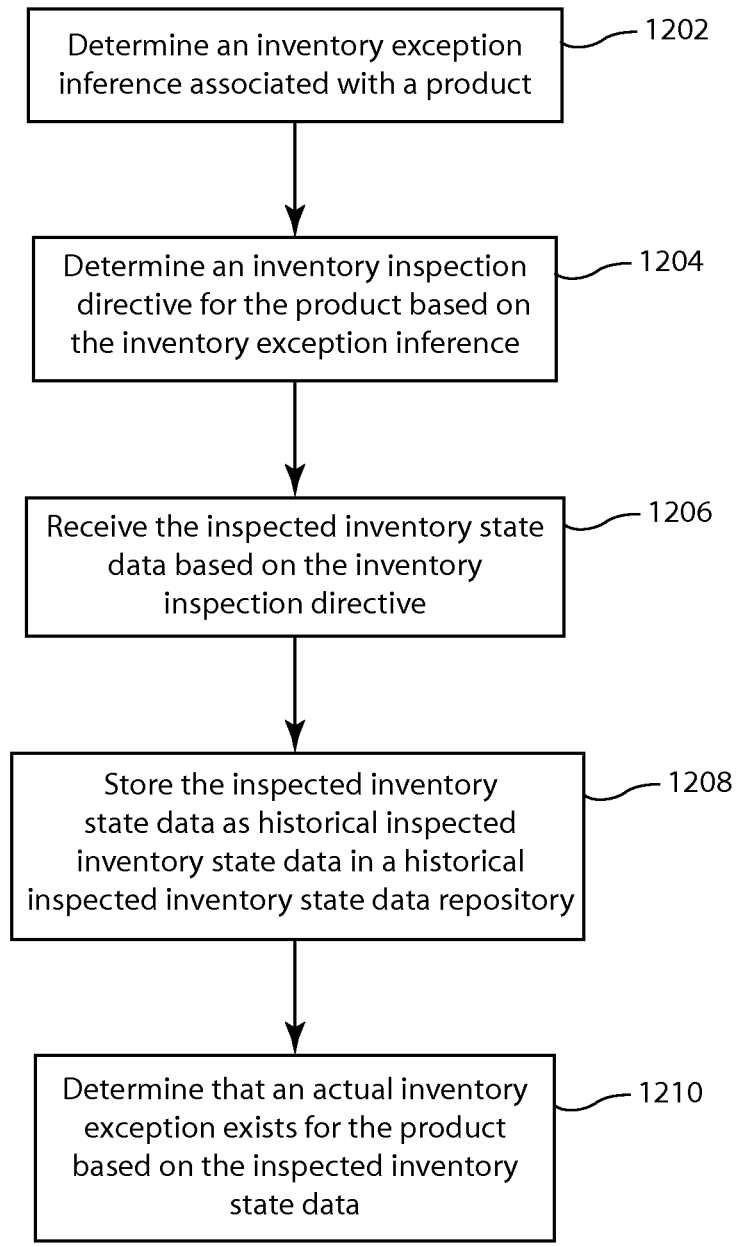
FIG. 12 is a flow diagram illustrating activities associated with an inventory inspection directive according to at least one example embodiment.

FIG. 12 is a flow diagram illustrating activities associated with an inventory inspection directive according to at least one example embodiment. In at least one example embodiment, there is a set of operations that corresponds with the activities of FIG. 12. An apparatus, for example inventory management system 120 of FIG. 1, or a portion thereof, may utilize the set of operations. The apparatus may comprise means, including, for example processor 240 of FIG. 2, for performance of such operations. In an example embodiment, an apparatus, for example inventory management system 120 of FIG. 1, is transformed by having memory, for example memory 242 of FIG. 2, comprising computer code configured to, working with a processor, for example processor 240 of FIG. 2, cause the apparatus to perform set of operations of FIG. 12.

In some circumstances, it may be desirable to store inspected inventory state data as historical inspected inventory state data. For example, it may be desirable to review recently received historical inspected inventory state data when determining that an actual inventory exception exists, similarly as described regarding FIG. 14. In this manner, the apparatus may reduce the amount of data acquisition to be performed when an inventory exception inference is determined.

In at least one example embodiment, the historical inspected inventory state data comprises information indicative of inspected inventory state data that was based, at least in part, on a prior determination of a different inventory exception. The historical inspected inventory state data may be stored in a historical inspected inventory state data repository. The historical inspected inventory state data repository may be comprised by the apparatus, may be separate from the apparatus, and/or the like. The historical inspected inventory state data may comprise information indicative of a timestamp that identifies a time, date, day, etc. in which the inspected inventory state data comprised by the historical inspected inventory state data was acquired. For example, the apparatus may determine a timestamp of the inspected inventory state data when the apparatus stores the inspected inventory state data as historical inspected inventory state data.

At block 1202, the apparatus determines an inventory exception inference associated with a product, similarly as described regarding block 902 of FIG. 9. At block 1204, the apparatus determines an inventory inspection directive for the product based, at least in part, on the inventory exception inference, similarly as described regarding block 904 of FIG. 9. At block 1206, the apparatus receives the inspected inventory state data based, at least in part, on the inventory inspection directive, similarly as described regarding block 906 of FIG. 9.

At block 1208, the apparatus stores the inspected inventory state data as historical inspected inventory state data in a historical inspected inventory state data repository.

At block 1210, the apparatus determines that an actual inventory exception exists for the product based, at least in part, on the inspected inventory state data, similarly as described regarding block 908 of FIG. 9.

Figure 13:
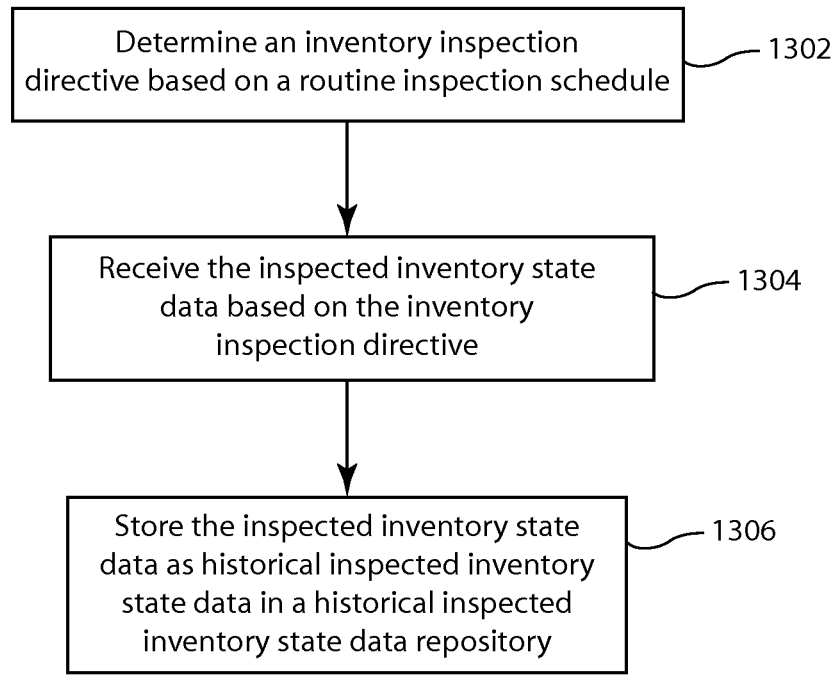
FIG. 13 is a flow diagram illustrating activities associated with an inventory inspection directive according to at least one example embodiment.

FIG. 13 is a flow diagram illustrating activities associated with an inventory inspection directive according to at least one example embodiment. In at least one example embodiment, there is a set of operations that corresponds with the activities of FIG. 13. An apparatus, for example inventory management system 120 of FIG. 1, or a portion thereof, may utilize the set of operations. The apparatus may comprise means, including, for example processor 240 of FIG. 2, for performance of such operations. In an example embodiment, an apparatus, for example inventory management system 120 of FIG. 1, is transformed by having memory, for example memory 242 of FIG. 2, comprising computer code configured to, working with a processor, for example processor 240 of FIG. 2, cause the apparatus to perform set of operations of FIG. 13.

In some circumstances, it may be desirable to routinely acquire inspected inventory state data without regard for an inventory exception inference. For example, it may be desirable to preemptively identify an actual inventory exception prior to identification of problems caused by the actual inventory exception. In at least one example embodiment, the apparatus determines an inventory inspection directive based, at least in part on a routine inspection schedule. The routine inspection schedule may be received by way of user input, by way of a configuration file, and/or the like. In some circumstances, the routine inspection schedule may comprise locations that have been previously identified as being involved with an actual inventory exception. For example, there may be a location where customers frequently leave maverick products. Such a location may be included in a routine inspection schedule.

At block 1302, the apparatus determines an inventory inspection directive based, at least in part, on a routine inspection schedule.

At block 1304, the apparatus receives the inspected inventory state data based, at least in part, on the different inventory inspection directive, similarly as described regarding block 906 of FIG. 9.

At block 1306, the apparatus stores the inspected inventory state data as historical inspected inventory state data in a historical inspected inventory state data repository, similarly as described regarding block 1208 of FIG. 12. In this manner, the historical inspected inventory state data may comprise information indicative of inspected inventory state data that was based, at least in part, on a routine inspection schedule.

Figure 14:
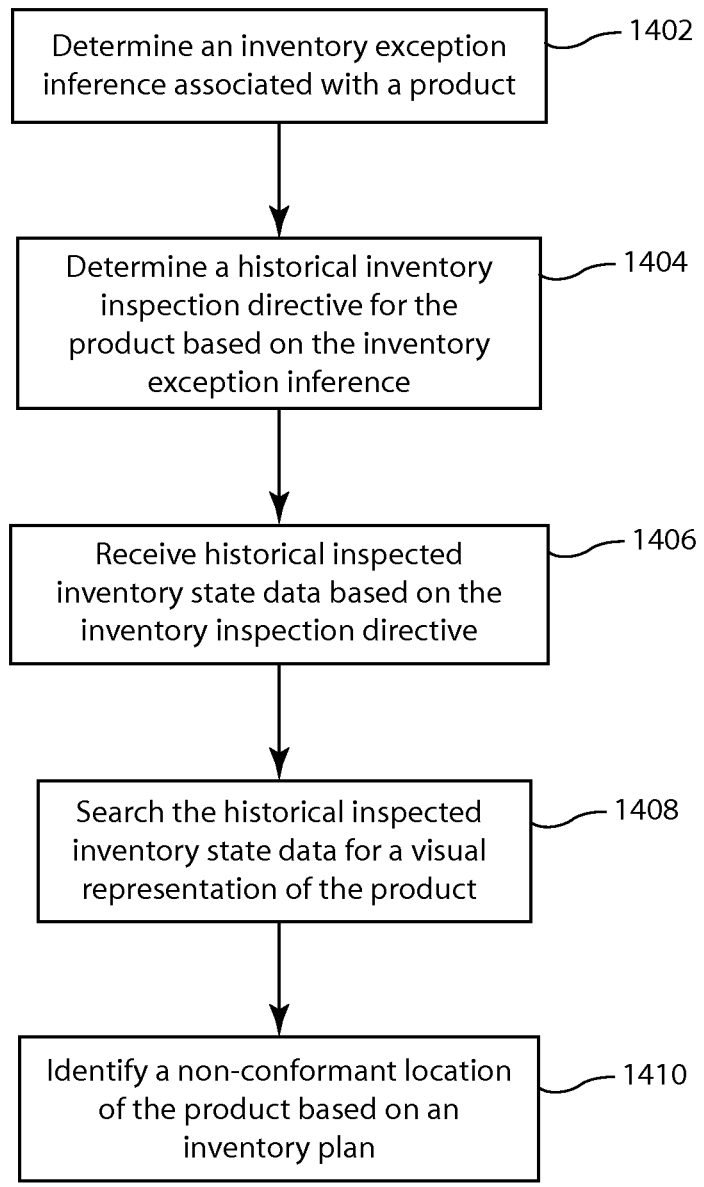
FIG. 14 is a flow diagram illustrating activities associated with an inventory inspection directive according to at least one example embodiment.

FIG. 14 is a flow diagram illustrating activities associated with an inventory inspection directive according to at least one example embodiment. In at least one example embodiment, there is a set of operations that corresponds with the activities of FIG. 14. An apparatus, for example inventory management system 120 of FIG. 1, or a portion thereof, may utilize the set of operations. The apparatus may comprise means, including, for example processor 240 of FIG. 2, for performance of such operations. In an example embodiment, an apparatus, for example inventory management system 120 of FIG. 1, is transformed by having memory, for example memory 242 of FIG. 2, comprising computer code configured to, working with a processor, for example processor 240 of FIG. 2, cause the apparatus to perform set of operations of FIG. 14.

As previously described, in some circumstances, it may be desirable to utilize historical inspected inventory state data when determine whether an actual inventory exception exists. For example, it may be desirable to utilize historical inspected inventory state data in relation to a maverick product inventory exception inference. In such circumstances, it may be difficult to identify a particular location to acquire inventory inspection data. In this manner, it may be desirable to search historical inspected inventory state data for indications of presence of the maverick product.

In at least one example embodiment, the apparatus determines a historical inventory inspection directive. The determination of the historical inventory inspection directive may be based, at least in part, on the determination of a maverick product inventory exception. In at least one example embodiment, the historical inventory inspection directive instructs evaluation of historical inspected inventory state data. The historic inventory inspection directive may comprise information that identifies the product. For example, the information that identifies the product may comprise visual information, RFID tag information, barcode information, and/or the like.

In at least one example embodiment, an apparatus may determine that an actual inventory exception exists by searching the historical inspected inventory state data for a visual representation of the product and identifying a non-conformant location of the product. As previously described, a non-conformant location may be a location that fails to conform with a location that is designated for the product by an inventory plan. As previously described in FIG. 10, in some circumstances, the apparatus may determine an inventory correction directive based, at least in part, on the determination that the actual inventory exception exists. In at least one example embodiment, the inventory correction directive comprises information indicative of the non-conformant location. For example, the inventory correction directive may comprise instructions that inform an employee to retrieve a maverick product from the non-conforming location and return the maverick product to a conforming location.

In some circumstances, it may be desirable to avoid searching historical inspected inventory state data of a conforming location. For example, it may be very easy to identify products that are placed at the conforming location. However, such identification may fail to identify any non-conforming location. In this manner, it may be desirable to avoid allocation of computing resources to evaluation of historical inspected inventory state data that corresponds with a conforming location of the product. In at least one example embodiment, the apparatus identifies, at least part of, the historical inspected inventory state data that corresponds with a location that is designated for the product by the inventory plan. In such an example, the search of the historical inspected inventory state data may omit the historical inspected inventory state data that corresponds with the location that is designated for the product by the inventory plan.

At block 1402, the apparatus determines an inventory exception inference associated with a product, similarly as described regarding block 902 of FIG. 9.

At block 1404, the apparatus determines a historical inventory inspection directive for the product based, at least in part, on the inventory exception inference.

At block 1406, the apparatus receives historical inspected inventory state data based, at least in part, on the inventory inspection directive. The historical inspected inventory state data may comprise information indicative of inspected inventory state data that was based, at least in part, on a prior determination of a different inventory exception, similarly as described regarding FIG. 12. The historical inspected inventory state data comprises information indicative of inspected inventory state data that was based, at least in part, on a routine inspection schedule, similar as described regarding FIG. 13.

At block 1408, the apparatus searches the historical inspected inventory state data for a visual representation of the product.

At block 1410, the apparatus identifies a non-conformant location of the product.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, as will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "includes", "including", "comprises" and/or "comprising," etc., when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. An apparatus, comprising:
at least one processor;
at least one memory including computer program code, the memory and the computer program code configured to, working with the processor, cause the apparatus to perform at least the following:
determine a deviation between projected sales of a product and actual sales of the product;
determine an inventory exception inference associated with the product based, at least in part, on the determination of a deviation between projected sales of the product and actual sales of the product, the inventory exception inference being an identification of circumstances that indicate that an inventory state of the product differs from an inventory plan for the product that identifies at least one intended location for the product;
determine an automated inventory inspection directive for the product based, at least in part, on the inventory exception inference, the automated inventory inspection directive comprising instructions configured to identify the product and the intended location for the product as, at least part of, mission data for an automated inventory data acquisition device that instruct the automated inventory data acquisition device to acquire inspected inventory state data for the product based, at least in part, on the product and the location, the inspected inventory state data being inventory state data that is based, at least in part on visual information captured by the automated inventory data acquisition device;
transmit the automated inventory inspection directive to the automated inventory acquisition device;
receive the inspected inventory state data from the automated inventory data acquisition device in response to the transmission of the automated inventory inspection directive to an automated inventory acquisition device;
determine that the inventory state data indicates non-conformance with the inventory plan; and
determine that an actual inventory exception exists for the product based, at least in part, on the determination that the inventory state data indicates non-conformance with the inventory plan.

2. The apparatus of claim 1, wherein the memory includes computer program code configured to, working with the processor, cause the apparatus to perform determination of an inventory correction directive based, at least in part, on the determination that the actual inventory exception exists.

3. The apparatus of claim 1, wherein the memory includes computer program code configured to, working with the processor, cause the apparatus to perform determination of a subset of the visual information based, at least in part, on the inventory exception inference, wherein the determination that the visual information indicates non-conformance with the inventory plan fails to include visual information beyond the subset of the visual information.

4. The apparatus of claim 1, wherein the memory includes computer program code configured to, working with the processor, cause the apparatus to perform storage of the inspected inventory state data as historical inspected inventory state data in a historical inspected inventory state data repository.

5. The apparatus of claim 1, wherein the memory includes computer program code configured to, working with the processor, cause the apparatus to perform evaluation of historical inspected inventory state data received from a historical state data repository, and the determination that the actual inventory exception exists for the product is based, at least in part, on the historical inspected inventory data.

6. The apparatus of claim 5, wherein the inventory exception inference is a maverick product exception inference, and determination that the actual inventory exception exists comprises:
search of the historical inspected inventory state data for a visual representation of the product; and
identification of a non-conformant location of the product, the non-conformant location being a location that fails to conform with the intended location for the product identified by the inventory plan.

7. The apparatus of claim 5, wherein the memory includes computer program code configured to, working with the processor, cause the apparatus to perform:
  determination of a different automated inventory inspection directive based, at least in part, on a routine inspection schedule, the different automated inventory inspection directive comprising instructions configured to identify the product and the intended location for the product as, at least part of, mission data for an automated inventory data acquisition device that instruct the automated inventory data acquisition device to acquire inspected inventory state data for the product;
  receipt of the different inspected inventory state data based, at least in part, on the different inventory inspection directive; and
  storage of the different inspected inventory state data as historical inspected inventory state data in a historical inspected inventory state data repository.

8. At least one non-transitory computer-readable medium encoded with instructions that, when executed by a processor, perform:
  determining a deviation between projected sales of a product and actual sales of the product;
  determining an inventory exception inference associated with the product based, at least in part, on the determination of a deviation between projected sales of the product and actual sales of the product, the inventory exception inference being an identification of circumstances that indicate that an inventory state of the product differs from an inventory plan for the product that identifies at least one intended location for the product;
  determining an automated inventory inspection directive for the product based, at least in part, on the inventory exception inference, the automated inventory inspection directive comprising instructions configured to identify the product and the intended location for the product as, at least part of, mission data for an automated inventory data acquisition device that instruct the automated inventory data acquisition device to acquire inspected inventory state data for the product based, at least in part, on the product and the location, the inspected inventory state data being inventory state data that is based, at least in part on visual information captured by the automated inventory data acquisition device;
  transmitting the automated inventory inspection directive to the automated inventory acquisition device;
  receiving the inspected inventory state data from the automated inventory data acquisition device in response to the transmission of the automated inventory inspection directive to an automated inventory acquisition device
  determining that the inventory state data indicates non-conformance with the inventory plan; and
  determining that an actual inventory exception exists for the product based, at least in part, on the determination that the inventory state data indicates non-conformance with the inventory plan.

9. The medium of claim 8, further encoded with instructions that, when executed by the processor, perform determination of an inventory correction directive based, at least in part, on the determination that the actual inventory exception exists.

10. The medium of claim 8, further encoded with instructions that, when executed by the processor, perform determination of a subset of the visual information based, at least in part, on the inventory exception inference, wherein the determination that the visual information indicates non-conformance with the inventory plan fails to include visual information beyond the subset of the visual information.

11. The medium of claim 8, further encoded with instructions that, when executed by the processor, perform storage of the inspected inventory state data as historical inspected inventory state data in a historical inspected inventory state data repository.

12. The medium of claim 8, further encoded with instructions that, when executed by the processor, perform evaluation of historical inspected inventory state data received from a historical state data repository, and the determination that the actual inventory exception exists for the product is based, at least in part, on the historical inspected inventory data.

13. The medium of claim 12, wherein the inventory exception inference is a maverick product exception inference, and determination that the actual inventory exception exists comprises:
  search of the historical inspected inventory state data for a visual representation of the product; and
  identification of a non-conformant location of the product, the non-conformant location being a location that fails to conform with the intended location for the product identified by the inventory plan.

14. The medium of claim 12, further encoded with instructions that, when executed by the processor, perform:
  determination of a different automated inventory inspection directive based, at least in part, on a routine inspection schedule, the different automated inventory inspection directive comprising instructions configured to identify the product and the intended location for the product as, at least part of, mission data for an automated inventory data acquisition device that instruct the automated inventory data acquisition device to acquire inspected inventory state data for the product;
  receipt of the different inspected inventory state data based, at least in part, on the different inventory inspection directive; and
  storage of the different inspected inventory state data as historical inspected inventory state data in a historical inspected inventory state data repository.

15. A method comprising:
  determining a deviation between projected sales of a product and actual sales of the product;
  determining an inventory exception inference associated with the product based, at least in part, on the determination of a deviation between projected sales of the product and actual sales of the product, the inventory exception inference being an identification of circumstances that indicate that an inventory state of the product differs from an inventory plan for the product that identifies at least one intended location for the product;
  determining an automated inventory inspection directive for the product based, at least in part, on the inventory exception inference, the automated inventory inspection directive comprising instructions configured to identify the product and the intended location for the product as, at least part of, mission data for an automated inventory data acquisition device that instruct the automated inventory data acquisition device to acquire inspected inventory state data for the product based, at least in part, on the product and the location, the inspected inventory state data being inventory state data that is based, at least in part on visual information captured by the automated inventory data acquisition device;
  transmitting the automated inventory inspection directive to the automated inventory acquisition device;

receiving the inspected inventory state data from the automated inventory data acquisition device in response to the transmission of the automated inventory inspection directive to an automated inventory acquisition device determining that the inventory state data indicates non-conformance with the inventory plan; and determining that an actual inventory exception exists for the product based, at least in part, on the determination that the inventory state data indicates non-conformance with the inventory plan.

16. The method of claim 15, further comprising determination of an inventory correction directive based, at least in part, on the determination that the actual inventory exception exists.

17. The method of claim 15, further comprising determination of a subset of the visual information based, at least in part, on the inventory exception inference, wherein the determination that the visual information indicates non-conformance with the inventory plan fails to include visual information beyond the subset of the visual information.

18. The method of claim 15, further comprising storing the inspected inventory state data as historical inspected inventory state data in a historical inspected inventory state data repository.

19. The method of claim 15, further comprising evaluation of historical inspected inventory state data received from a historical state data repository, and the determination that the actual inventory exception exists for the product is based, at least in part, on the historical inspected inventory data.

20. The medium of claim 15, wherein the inventory exception inference is a maverick product exception inference, and determination that the actual inventory exception exists comprises:

search of the historical inspected inventory state data for a visual representation of the product; and identification of a non-conformant location of the product, the non-conformant location being a location that fails to conform with the intended location for the product identified by the inventory plan.

* * * * *